(12) United States Patent
Beauchamp et al.

(10) Patent No.: US 12,347,046 B2
(45) Date of Patent: Jul. 1, 2025

(54) AUGMENTED REALITY ENABLED DYNAMIC PRODUCT PRESENTATION

(71) Applicant: Shopify Inc., Ottawa (CA)

(72) Inventors: Daniel Beauchamp, Toronto (CA); Byron Leonel Delgado, Ottawa (CA); Jonathan Wade, Ottawa (CA)

(73) Assignee: Shopify Inc., Ottowa (CA)

( * ) Notice: Subject to any disclaimer, the term of this patent is extended or adjusted under 35 U.S.C. 154(b) by 0 days.

(21) Appl. No.: 18/444,437

(22) Filed: Feb. 16, 2024

(65) Prior Publication Data

US 2024/0233286 A1    Jul. 11, 2024

Related U.S. Application Data

(63) Continuation of application No. 17/824,828, filed on May 25, 2022, now Pat. No. 11,935,202.

(51) Int. Cl.
*G06T 19/00* (2011.01)
*G06F 3/16* (2006.01)
*G06Q 30/0601* (2023.01)

(52) U.S. Cl.
CPC ............ *G06T 19/006* (2013.01); *G06F 3/167* (2013.01); *G06Q 30/0643* (2013.01)

(58) Field of Classification Search
CPC ... G06T 19/006; G06F 3/167; G06Q 30/0643; G06V 20/20
See application file for complete search history.

(56) References Cited

U.S. PATENT DOCUMENTS

| | | |
|---|---|---|
| 6,653,990 B1 | 11/2003 | Lestruhaut |
| 11,017,611 B1 * | 5/2021 | Mount .................. G06V 20/20 |
| 11,126,320 B1 * | 9/2021 | Thompson ............ G06F 3/0482 |
| 11,204,678 B1 * | 12/2021 | Baker ................. G06F 3/04842 |
| 11,935,202 B2 * | 3/2024 | Beauchamp .......... G06T 19/006 |
| 2002/0095265 A1 | 7/2002 | Satoh et al. |
| 2012/0105473 A1 | 5/2012 | Bar-Zeev et al. |
| 2012/0113223 A1 | 5/2012 | Hilliges et al. |

(Continued)

OTHER PUBLICATIONS

Debreczeni, Adam, "Multi-user AR experience". Published Jan. 17, 2018, but accessed Jun. 3, 2021.

(Continued)

*Primary Examiner* — Jeffery A Brier
(74) *Attorney, Agent, or Firm* — Foley & Lardner LLP

(57) ABSTRACT

Systems and methods described herein allow a customer to employ AR/VR software to generate virtual representations of physical spaces (e.g., house) and sub-spaces (e.g., living room) to preview virtual objects situated in AR/VR virtual environments. A commerce system (or mobile app associated with the commerce system) may generate virtualized environments representing a physical space (e.g., house, apartment) and regions (e.g., living room, kitchen) based on source images uploaded to or otherwise captured by the commerce system. The end-user may operate the software on a client device and interacts with VR or AR presentations of the virtual environment using a voice-based interface recognized by the software. For example, the end-user may say the name of room (region) or an object and the system retrieves data of the identified room or an appropriate room, such as virtual representations of furniture or objects situated in the room.

20 Claims, 21 Drawing Sheets

(56) References Cited

U.S. PATENT DOCUMENTS

| | | |
|---|---|---|
| 2016/0085305 A1 | 3/2016 | Spio |
| 2016/0350973 A1 | 12/2016 | Shapira et al. |
| 2019/0114802 A1 | 4/2019 | Lazarow |
| 2019/0262701 A1 | 8/2019 | Forster |
| 2020/0050256 A1 | 2/2020 | Yamamoto et al. |
| 2020/0174254 A1 | 6/2020 | Wieczorek |
| 2020/0193976 A1 | 6/2020 | Cartwright et al. |
| 2021/0012113 A1 | 1/2021 | Petill et al. |
| 2022/0053233 A1* | 2/2022 | Baxter ............... H04N 21/4782 |
| 2022/0075504 A1 | 3/2022 | Little et al. |
| 2022/0172437 A1 | 6/2022 | Ghislandi et al. |
| 2022/0245888 A1 | 8/2022 | Singh et al. |

OTHER PUBLICATIONS

Non-Final Office Action on U.S. Appl. No. 17/824,828 dated Aug. 29, 2023 (10 pages).

Notice of Allowance on U.S. Appl. No. 17/824,828 dated Nov. 15, 2023 (9 pages).

Szeliski, Richard, "Computer Vision: Algorithms and Applications (Chapter 4: Feature detection and matching)", Sep. 3, 2010, pp. 205-266.

* cited by examiner

AUGMENTED REALITY ENABLED DYNAMIC PRODUCT PRESENTATION

CROSS-REFERENCE TO RELATED APPLICATION

This application is a continuation of U.S. application Ser. No. 17/824,828, filed May 25, 2022, which is incorporated by reference in its entirety.

TECHNICAL FIELD

This application relates generally to graphical user interfaces, and, more particularly, to dynamic revision of graphical user interfaces such as may be employed in scenarios involving/related to augmented reality.

BACKGROUND

A person looking for home decor may want to preview specific products in their surrounding space using augmented reality (AR) or virtual reality (VR). Currently, several online retailers have enabled support for viewing products in AR. A person browsing a brick-and-mortar store or other physical location may wish to preview a particular object (e.g., furniture, appliance, decorative object) in a room of the person's home or other space (e.g., office).

BRIEF DESCRIPTION OF THE DRAWINGS

The accompanying drawings constitute a part of this specification and illustrate embodiments of the subject matter disclosed herein.

DETAILED DESCRIPTION

Figure 1:
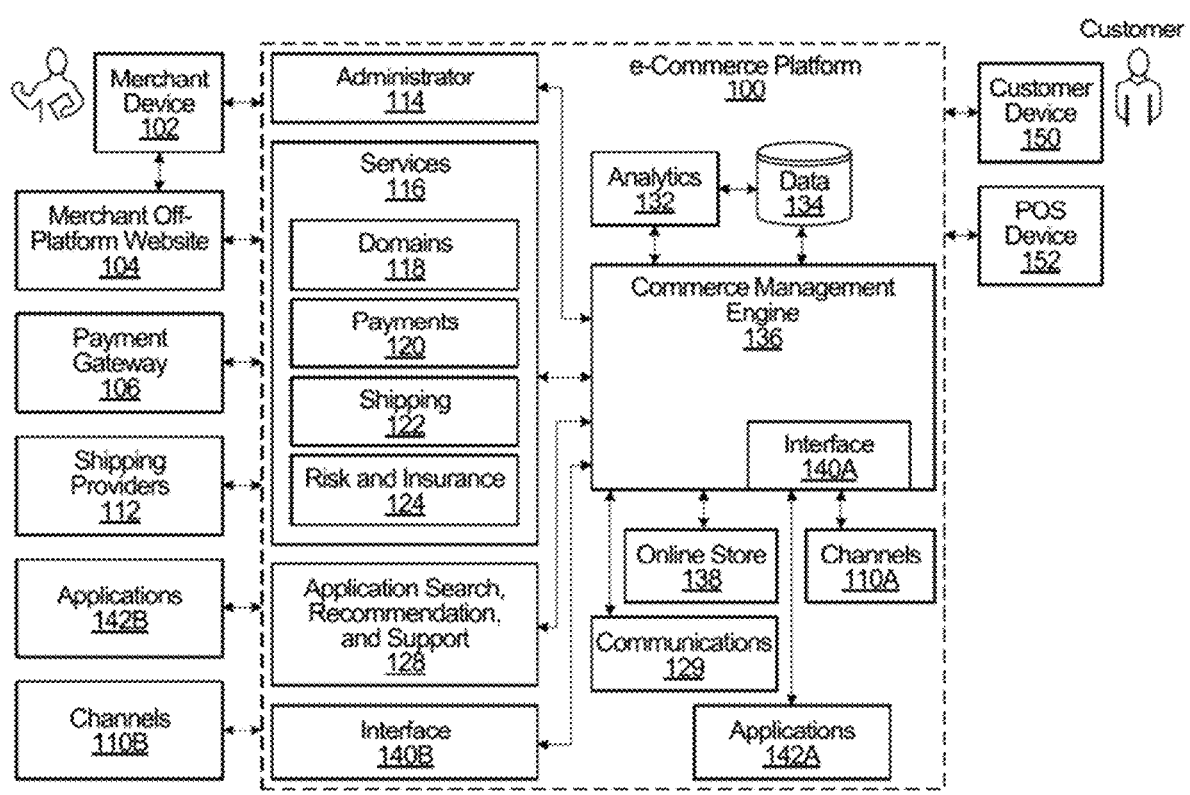
FIG. 1 shows an e-commerce platform, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Allowing customers to initiate virtual experiences such as, for example, previewing particular objects in a virtual environment, may prompt the person to initiate a virtual experience by loading a stored virtual environment of their house and traverse the virtual environment to the relevant location (e.g., living room) to preview virtual representations of the object there. This may be a cumbersome and time-consuming process for the person to efficiently navigate a virtual environment and place an object.

The systems and methods described herein may allow a customer to more efficiently navigate such virtual environments such as for placement of objects therein. Virtual reality (VR) and/or augmented reality (AR) software may generate and present a virtual representation of the object (e.g., virtual object representing a couch) situated in a virtual environment representing a region or sub-space (e.g., living room) of a customer's larger physical space (e.g., house). A sub-space may be a physical, real-world portion of a larger space. For example, a user's living room may be one of (any number of) the sub-spaces within a larger space, such as the user's house. The physical sub-space corresponds to location information (e.g., coordinates, descriptive labels or tags) indicating the sub-space's relation to the space and other sub-spaces. A virtualized representation of the sub-space or region may correspond to a set of coordinates representing the three-dimensional sub-space. As an example, the virtual representation of the space may encompass all or most of the customer's house, and the sub-space may refer to the virtual representation of the sub-space encompassing the customer's living room, which corresponds to a set of coordinates. A commerce system (or mobile app associated with the commerce system) may generate virtualized environments representing a physical space (e.g., house, apartment, office building) and regions (e.g., rooms of the house or apartment, individual offices) based on images uploaded to or otherwise captured by the commerce system. The end-user may operate the software on a client device and interact with VR or AR presentations of the virtual environment using a voice-based interface. For example, the end-user may speak the name of a room (region) or an object, and the system may retrieve data of the identified room or an appropriate room, such as virtual representations of furniture or objects situated in the room.

A natural-language processing (NLP) machine-learning function may receive and recognize an end-user's voice commands for navigating the appropriate virtual environment representing the space. The NLP function may be executed by client-side software ("client app") or by a server of the commerce system. In a configuration, speaker diarization operations capture speech signal features extracted from a spoken utterance and generate a transcription of the verbal commands based upon the speech signal features extracted from the utterance. A NLP function may then ingest the transcription and interpret the instructions into machine-executed instructions for the client app or the commerce system. A microphone captures an analog audio single containing the spoken utterance, which the microphone converts to an electrical signal and machine-executable instructions (e.g., software, firmware) of the microphone, processor, and/or operating system converts the electrical signal into a digital audio signal containing the speech signal including the verbal instructions in digital form for the client app or commerce system.

A scanning function may perform active or passive processes for generating the virtual environments from the physical space by using images of the region captured by the client device. The scanning functions may be performed by the client app or the commerce system and may include executing computer vision and/or object recognition functions using the captured images, where various types of optical sensors of system devices (e.g., visual cameras, LIDAR sensors, infrared sensors) may perform the scanning functions and generate corresponding types of optical data (referred to herein as "images" or "image data"). The scanning functions may capture images of the region and generate (or map) a coordinate plane of the region according to physical contour features or objects as identified in the images. The scanning function may use the coordinate plane to build the virtual environment and situate the virtual objects within the virtual environment.

In further building the virtual environment, the system may generate and store an object table associated with the region, which lists the objects in the region. A region may be inferred by the objects typically associated with that region. An object may be located based on the location (coordinates) of other objects.

A sectioning function associates each region with one or more identifiers (e.g., label, voice recognition identifier), which may use a user configuration input. The sectioning function allows the system to logically partition a space into regions. The user may manually input the identifiers for a particular room. Additionally or alternatively, a machine-learning operation recognizes the type of region (e.g., living room, kitchen, bathroom) based on commonly recognized features (e.g., couch, oven, bathtub) and natural physical partitions or barriers (e.g., doorway), then automatically associates the identifiers with the particular region. The client app may present the end-user with a prompt to confirm the machine-learning operation accurately identified the particular region. When the user submits a voice command through the client app (e.g., "display this table in my living room"), the client app or server may reference the identifiers (e.g., voice identifier) to retrieve and display the appropriate region.

The client app or server may recognize a new object from an image and generate a new virtual representation of the new object. For example, the end-user may capture an image of the new object when browsing a brick-and-mortar store. The client app may recognize the object by executing an objection recognition function or querying one or more databases and/or the Internet. The system then situates the new virtual object in the virtual representation of a particular region according to the user's instructions. The user may submit a verbal instruction to preview the virtual object within the desired region (e.g., "show me this couch in my living room"), which instructs the system to display the virtual environment containing the new virtual object. The user may navigate, rotate, reorganize, or otherwise alter the digital representation of the room containing the new virtual object through various types of inputs to the client app.

When generating the virtual object within the virtual environment, the client app may situate the virtual object according to user inputs, automated algorithms, or preconfigured or defined defaults, where the defaults are defined in the client app configurations at some time in advance of situating the virtual object. The client app may be preconfigured to situate the object in the user's line-of-sight, directly in front of the end-user, or in the center of the region, and may be preconfigured to situate the object in an appropriate location (e.g., place a vase on a table, not on a sofa). Additionally or alternatively, the user enters a touch-based input to "hold" and "drop" the virtual object within a particular location. The client app may maintain contextual awareness of the other objects in the region according to the three-dimensional coordinate plane, allowing the client app to situate the new virtual object relative to the other objects in the room (e.g., place a virtual lamp on top of a virtual side table in the virtual living room). In this way, the client app may identify and avoid "collisions" of overlapping virtual objects. Such collisions do not necessarily occur when virtual objects are in "contact," because virtual objects are typically in contact with other virtual objects (e.g., a lamp situated on a table, a blanket situated on a couch); the client app may identify and avoid collisions that would unrealistically situate the overlapping virtual objects as a function of real-world physics (e.g., a lamp situated partly within a solid table, a blanket situated within a solid couch).

Optionally, the system automatically selects which region to present to the end-user based upon the type of new object. The system may execute object recognition functions to recognize the new object and machine-learning operations to predict the particular sub-space to retrieve and display to the end-user. The client app then displays the virtual environment having the new virtual object.

Optionally, the system dynamically selects whether to present the new virtual object in an AR or a VR representation of the region. In certain circumstances, the user might be located in the particular room, obviating the need to present the new object in a digital representation of that room. The client app may generate and present the new object within an image of a room via an augmented representation of a camera feed when the client app or server determines that the end-user is located in the room, such as using geo-location data or by executing the machine-learning operations for identifying the particular region.

An Example E-Commerce Platform

In some embodiments, the methods disclosed herein may be performed on or in association with a commerce platform, such as an e-commerce platform. Therefore, an example of a commerce platform will be described.

FIG. 1 illustrates an e-commerce platform 100, according to an illustrative system embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors, which may be part of or external to the e-commerce platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., brick-and-mortar retail stores), a merchant off-platform website 104 (e.g., a commerce Internet website or other internet or web property or asset supported by or on behalf of the merchant separately from the e-commerce platform 100), and the like. However, even these 'other' merchant commerce facilities may be incorporated into the e-commerce platform 100, such as where POS devices 152 in a physical store of a merchant are linked into the e-commerce platform 100, where a merchant off-platform website 104 is tied into the e-commerce platform 100, such as through "buy buttons" that link content from the merchant off-platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop-ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms of online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant device 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build web pages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The web browser (or other application) of the customer device 150 then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their web site's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g., as data facility 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an online business, such as providing a domain service 118 associated with their online store, payment services 120 for facilitating transactions with a customer, shipping services 122 for providing customer shipping options for purchased products, risk, and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Even though the shipping services 122 is shown as a part of the e-commerce platform 100, the shipping services 122 may be implemented by a third party, such as a third party delivery or shipping service. The shipping service 122 may have a server or other computer device in communication with the e-commerce platform 100 where the shipping service 122 may communicate shipping requirements (e.g., shipping weight, categories, restrictions, and preferences). The e-commerce platform 100 may then use these requirements to dynamically update one or more graphical user interfaces discussed herein. The shipping service 122 may then receive delivery instructions from the e-commerce platform 100 and may perform the delivery using a delivery apparatus discussed herein. The shipping service 122 may also be in communication with a delivery provider's servers and/or a delivery apparatus processor, such delivery data (e.g., status of different deliveries) can be communicated to the e-commerce platform 100.

Therefore, shipping service 122 may or may not be a part of the e-commerce platform 100. For instance, the shipping service 122 may be associated with a separate entity that transmits its requirements and receives delivery instructions from the e-commerce platform 100. In another embodiment, the methods and systems discussed herein may be provided as a standalone service where the shipping service 122 utilizes the e-commerce platform 100 to dynamically customize graphical user interfaces and transmit delivery instructions and attributes back to the shipping service 122.

In a non-limiting example, the shipping service 122 represents a server of a delivery platform that utilizes a drone to deliver food. The shipping service 122 first transmits drone delivery requirements to the e-commerce platform 100, such that various graphical user interfaces are revised accordingly. When the customer's order is finalized, the e-commerce platform 100 transmits delivery data (e.g., products and address) to the shipping service 122.

Figure 2:
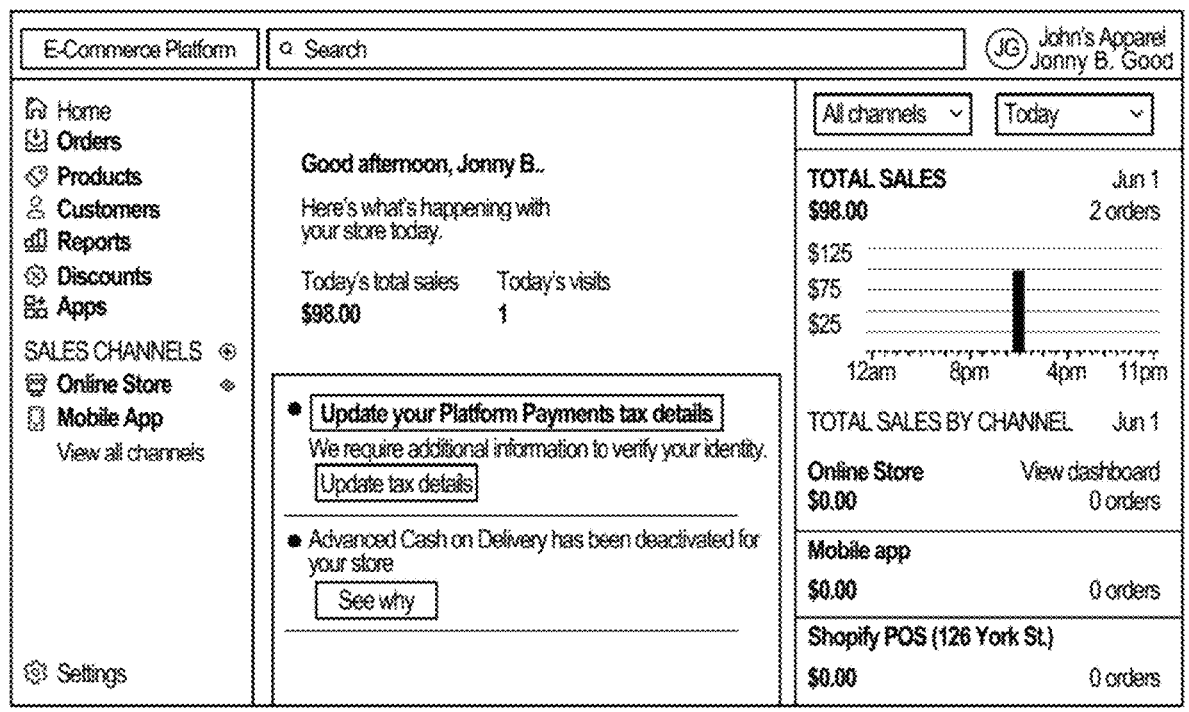
FIG. 2 depicts a home page of a merchant administrator, according to an embodiment.

FIG. 2 depicts a non-limiting embodiment for a home page of a merchant administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store 138, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the merchant device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g., via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's bank account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the e-commerce platform 100 or by a different party. In some embodiments, an application 142B may be provided by the same party providing the e-commerce platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the e-commerce platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the e-commerce platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension or API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or AR interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel-specific. The online store 138 cart may be composed of multiple cart line products, where each cart line product tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and may track quantities for variants that have inventory tracking enabled. It may decouple product variants (a customer-facing concept representing the template of a product listing) from inventory items (a merchant facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that does not provide an API connection). An API fulfillment service may trigger a third-party, where the third-party application creates a fulfillment record. A legacy fulfillment service may trigger a custom API call from the commerce management engine 136 to a third-party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Example Networked Components of System

Figure 3:
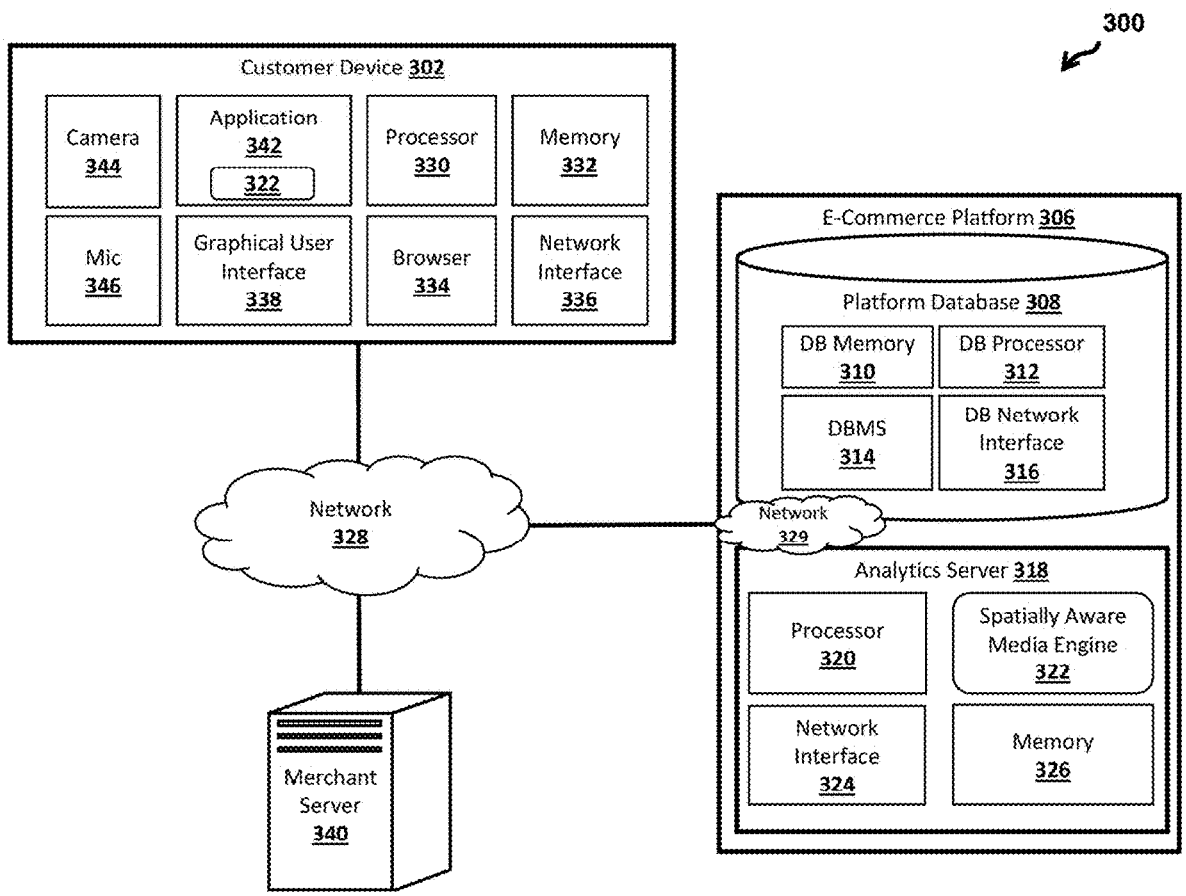
FIG. 3 illustrates components of a system offering dynamic product presentation, according to an embodiment.

FIG. 3 illustrates components of a system 300 offering dynamic product presentation, according to an embodiment. The system 300 includes a customer device 302 and a merchant server 340 to connect with an e-commerce platform 306 via a network 328. The depicted system 300 is described and shown in FIG. 3 as having one of each component for ease of description and understanding of an example. The embodiments may include any number of the components described herein. The embodiments may comprise additional or alternative components, or may omit certain components, and still fall within the scope of this disclosure.

The network 328 may include any number of networks, which may be public and/or private networks. The network 328 may comprise hardware and software components implementing various network and/or telecommunications protocols facilitating communications between various devices, which may include devices of the system 300 or any number of additional or alternative devices not shown in FIG. 3. The network 328 may be implemented as a cellular network, a Wi-Fi network, or other wired local area networks (LAN) or wireless LAN, a WiMAX network, or other wireless or wired wide area network (WAN), and the like. The network 328 may also communicate with external servers of other external services coupled to the network 328 such as servers hosting a social media platform, a banking platform, or the merchant server 340.

The network 328 may include any number of security devices or logical arrangements (e.g., firewalls, proxy servers, DMZs) to monitor or otherwise manage web traffic to the e-commerce platform 306. Security devices may be configured to analyze, accept, or reject incoming web requests from the customer device 302, the merchant server 340, and/or the customer device 302. In some embodiments, the security device may be a physical device (e.g., a firewall). Additionally or alternatively, the security device may be a software application (e.g., Web Application Firewall (WAF)) that is hosted on, or otherwise integrated into, another computing device of the system 300. The security devices monitoring web traffic are associated with and administered by the e-commerce platform 306.

The customer device 302 may be any electronic device comprising hardware and software components capable of performing the various tasks and processes described herein. Non-limiting examples of the customer device 302 may include mobile phones, tablets, laptops, and personal computers, among others. The customer device 302 may be a mobile phone, tablet, gaming console, laptop, or computer, owned and/or used by the customer. The customer device 302 may include a processor 330, memory 332, graphical user interface 338, and network interface 336. The customer device 302 may comprise or receive media data a camera 344 and microphone 346. The customer device 302 may execute a browser 334 or application 342 associated with the e-commerce platform 306. An example of the graphical user interface 338 may be presented at a display screen (e.g., touchscreen) of the customer device 302. The network interface 336 is provided for communicating over the network 328. The structure of the network interface 336 will depend on how the customer device 302 interfaces with the network 328. For example, if the customer device 302 is a mobile phone or tablet, the network interface 336 may include a transmitter, receiver, or transceiver with an antenna for sending and receiving wireless transmissions to or from the e-commerce platform 306 or merchant server 340 via the network 328.

The customer device 302 may be connected to the network 328 with a network cable. The network interface 336 may include, for example, a network interface card (NIC), a computer port, and/or a network socket. The processor 330 directly performs or instructs all of the operations performed by the customer device 302. Non-limiting examples of these operations include processing customer inputs received from the graphical user interface 338 or microphone 346, preparing information for transmission over the network 328, processing data received over the network 328, and instructing a display screen to display information. The processor 330 may be implemented by one or more processor devices that execute instructions stored in the memory 332. Alternatively, some or all of the processor 330 may be implemented using dedicated circuitry, such as an ASIC, a GPU, or a programmed FPGA.

When communicating with components of the e-commerce platform 306, the customer device 302 may generate web traffic (or web session data) that is processed by or otherwise accessible to the analytics server 318 of the e-commerce platform 306. The web traffic may comprise data packets that include various types of data that can be parsed, analyzed, or otherwise reviewed by various programmatic algorithms of the analytics server 318. For instance, the web traffic data may indicate which electronic content was accessed by a customer operating the customer device 302.

In an example, a customer operating the customer device 302 accesses a merchant's online store by either visiting a website of the merchant hosted by the merchant server 340 using the browser 334 or executing the application 342. The merchant's online store may include one or more features hosted (or otherwise produced or functionally controlled) by the analytics server 318. For instance, the analytics server 318 may revise one or more features displayed on the merchant's online store. The browser 334 and/or the application 342 may transmit and receive data packets to display various features of the merchant's online store on a graphical user interface 338.

The camera 344 of the customer device 302 can generate media data and provide machine-readable media data elements (e.g., video feed), which the customer device 302 may provide to various devices of the system 300. For instance, software components of the analytics server 318 (e.g., spatially aware media engine 322 executed by the analytics server 318) may analyze and/or dynamically revise the media data generated by the camera 344.

The customer device 302 may include a microphone 346 that captures sound including the customer's utterance, and converts the sound from analog sound waves into electronic digital signals representing the sound of the original analog sound waves. In some cases, the audio waves captured by the microphone 346 may be included with visual media data generated by the camera 344 as the audio component of an audiovisual video feed. In some cases, the audio waves captured by the microphone 346 may be independent media data.

The software executed by the customer device 302 (or the analytics server 318) may perform various speech recognition (e.g., speaker diarization) operations on the utterance received via the microphone 346. The software may include programming for machine-learning architecture that includes layers for speaker diarization that extracts features of the utterance, converts the features to various electrical or frequency intensity representations, identifies certain terms or phrases, and outputs a transcription of the utterance in, for example, a text-based computer file, or various other machine-readable formats capable of storing the transcription outputted from the speaker diarization. The customer device 302 (or the analytics server 318) may execute additional layers of the (same or different) machine-learning architecture to determine the content of the utterance using the output of the speaker diarization. In operation, the machine-learning architecture ingests the transcription data and performs various natural-language processing operations on the transcription file to identify terms and phrases in the transcription and determine the content of the original utterance of the customer.

The content may include, for example, spoken user-interface instructions allowing the customer to interact with (e.g., rotate, zoom, reposition the customer's view, reposition virtual objects) the graphical user interface 338 and the software application 342 executed by the customer device 302. Additionally or alternatively, the spoken user-interface instructions may provide instructions to the e-commerce platform 306, components of the e-commerce platform 306 (e.g., analytics server 318), or the merchant server 340, such as beginning a checkout purchasing transaction, placing an object in the customer's virtual cart, and executing a query of the platform database 308, among other instructions.

The merchant's online store may refer to any electronic platform that is directly or indirectly hosted by a merchant associated with the merchant server 340. For instance, the merchant's online store may be a website displayed on the browser 334 or the mobile application 342 of the customer device 302, and may be hosted (or otherwise functionally controlled) by the merchant server 340 and/or the analytics server 318. In the embodiments where the merchant's online store is a website, the customer operating the customer device 302 may execute the browser 334 (or other application) to connect the customer device 302 to (or otherwise access) the analytics server 318 and/or the merchant server 340 using an IP Address obtained by translating a domain name of the website. The analytics server 318 and/or the merchant server 340 may execute code associated with the website and render the appropriate graphics to be presented to the graphical user interface 338. In embodiments where the merchant's online store is hosted on a cloud-based mobile application of the merchant or the e-commerce platform 306, the customer device 302 may execute an application 342 that is installed on the customer device 302. The customer device 302 and/or the application 342 may then execute the appropriate code to display features of the merchant's online store onto the graphical user interface 338.

Even though certain embodiments described herein describe the website as being hosted by the merchant server 340, the methods and systems described herein also apply to websites associated with the merchant server 340 that are hosted by a third-party web server. Furthermore, the methods described herein are also applicable to any application executed/displayed on the customer device 302 (whether associated with the merchant server 340 or not).

The customer may operate the camera 344 to capture media data (e.g., image data, video data, LIDAR data) of a real world physical space and/or sub-space regions of the physical space. The various operations described herein for ingesting and analyzing the media data to generate virtual representations of the media data may be performed mostly or entirely on the customer device 302 by the customer processor customer processor 330 and customer application 342. In this way, the customer may be more comfortable about privacy concerns, as the customer's private images of the customer's spaces and sub-spaces (e.g., home, office, living room, kitchen, bedroom) remain on the customer device 302 and unavailable to the commerce platform 306 or the merchant server 340. In some embodiments, however, the customer device may 302 upload the media data to the e-commerce platform 306 and the analytics server 318 may perform all of the operations for generating the virtual representations or the analytics server 318 and the customer device 302 may cooperatively perform portions of the operations of generating the virtual representations. In operation, the customer device 302 may perform various processes that, for example, ingest the media data and generate one or more virtual environments for the customer. The virtual environments are virtual representations of the customer's physical space and/or sub-space regions within the physical space.

The customer memory 332, or in some embodiments, the DB memory 310 of the platform database 308, may store the media data received from the camera 344 and the virtual environments. In some cases, when the customer registers credentials with the services hosted by the e-commerce platform 306, the application 342 or browser 334 may prompt the new customer to capture and generate the one or more new virtual environments for the new customer.

The customer device 302 may perform various software processes for generating the virtual environment, which may include layers of a machine-learning architecture for computer vision, object recognition, and object or sub-space classification, and spatial awareness (e.g., spatially aware media engine 322). The customer device 302 may also receive user inputs from the customer via the graphical user interface 338 and/or via the microphone 346. For a particular sub-space region, the customer device 302 may recognize attributes of the region, such as the dimensions, colors, and barriers (e.g., walls, half-walls, doorways, windows) in the sub-space using the media data received from the customer device 302. The customer device 302 may generate a virtual environment for the corresponding region based on the attributes of the region. The attributes recognized by the customer device 302 may also recognize the objects in the region, where the customer device 302 may generate virtual objects representing the recognized real world objects and situates the virtual objects in the virtual environment.

In some implementations, the application 342 may periodically prompt the customer to capture updated media data at given time intervals or expiration thresholds, or in response to certain triggering events, such as detecting a transaction in which the customer purchases new furniture from a certain merchant registered with the e-commerce platform 306. In some implementations, the application 342 may automatically instruct the customer device 302 to generate (via the camera 344) and/or upload updated image data (e.g., visual image data, LIDAR data) for the physical space, at predetermined time intervals or in response to the camera 344 of the customer device capturing new image data (e.g., visual image data, LIDAR data). The customer device 302 may generate an updated virtual environment and/or updated virtual objects for a particular region based upon the updated media data for that region.

The application 342 of the customer device 302 may employ virtual reality (VR) and/or augmented reality (AR) software programming that generates and presents the virtual environments and/or objects to the customer via the graphical user interface 338. For VR operations, the application 342 retrieves the virtual environment of a particular region requested by the customer and presents the virtual environment and the virtual objects to the customer via the graphical user interface 338. Using the graphical user interface 338 or through spoken instructions captured by the microphone 346, the customer may interact with the virtual objects situated within the virtual environment of the region or manipulate other attributes of the virtual environment of the region. The customer may preview objects in the region by instructing the application 342 to update the virtual environment to include a preview virtual object. The application 342 may recognize a real world object or an object available on the merchant server 340 store and generate the preview virtual object. Additionally or alternatively, the application 342 may retrieve a pre-stored virtual object from the customer memory 332, the platform database 308 or merchant server 340. The application 342 may update the virtual environment presented on the graphical user interface 338 to include the preview virtual object situated within the virtual environment.

For AR operations, the application 342 may activate the camera 344 and presents an ongoing video feed from the camera 344 having virtualized overlays within the video feed presented via the graphical user interface 338. For instance, the graphical user interface 338 may present a video feed of the customer's region (e.g., living room) with an overlay of a particular preview virtual object (e.g., lamp), as generated or retrieved by the application 342. Optionally, the application 342 may receive still image data, LIDAR data, or stored video data, and generate the virtualized overlays on the still image or video data.

The customer may operate the application 342 on the customer device 302 by interacting with the graphical user interface 338 or by providing voice-interface instructions to the microphone 346. The customer may say the name of the region or the preview object, causing the application 342 to retrieve the virtual environment and virtual object data of the identified region or objects, or an appropriate region based on the preview object. The application 342 may then retrieve (from the customer memory 332 or the platform database 306) and present the customer's virtual environment corresponding to the region spoken by the customer or that the application 342 or analytics server 318 determines as a predicted region relevant to the customer's request or a type of object spoken by the customer. The application 342 then presents the customer's virtual environment and the preview object situated in the virtual environment via the graphical user interface 338.

The e-commerce platform 306 is a computing system infrastructure that may be owned and/or managed (e.g., hosted) by an e-commerce service and, in some embodiments, may be the same as or similar to that described with reference to FIGS. 1-2, though this need not be the case. The e-commerce platform 306 includes electronic hardware and software components capable of performing various processes, tasks, and functions of the e-commerce platform 306. For instance, the computing infrastructure of the e-commerce platform 306 may comprise one or more platform networks 329 interconnecting the components of the e-commerce platform 306. The platform networks 329 may comprise one or more public and/or private networks and include any number of hardware and/or software components capable of hosting and managing the networked communication among devices of the e-commerce platform 306.

As depicted in FIG. 3, the components of the e-commerce platform 306 include the analytics server 318 and platform database 308. However, the embodiments may include additional or alternative components capable of performing the operations described herein. In some implementations, certain components of the e-commerce platform 306 may be embodied in separate computing devices that are interconnected via one or more public and/or private internal networks (e.g., network 328, platform network 329). In some implementations, certain components of the e-commerce platform 306 may be integrated into a single device. For instance, the analytics server 318 may host the platform database 308.

Furthermore, the e-commerce platform 306 may include the analytics server 318 configured to serve various functions of the e-commerce platform 306. Non-limiting examples of such functions may include webservers hosting webpages and applications (or at least a portion of a webpage or an application) on behalf of merchants (e.g., merchants' online stores), security servers executing various types of software for monitoring web traffic (e.g., determining that a customer has accessed an electronic platform hosted by the merchant server 340), and database servers hosting various platform databases 308 of the e-commerce platform 306, among others.

The illustrative e-commerce platform 306 is shown and described as having only one analytics server 318 performing each of the various functions of the e-commerce service. For instance, the analytics server 318 is described as serving the functions of executing a spatially aware media engine 322 and a web server hosting webpages for merchants' online stores and account administration. It is intended that FIG. 3 is merely illustrative and that embodiments are not limited to the description of the system 300 or the particular configuration shown in FIG. 3. The software and hardware of the analytics server 318 may be integrated into a single distinct physical device (e.g., a single analytics server 318) or may be distributed across multiple devices (e.g., multiple analytics servers 318). In some implementations, the analytics server 318 may be a virtual machine (VM) that is virtualized and hosted on computing hardware configured to host any number of VMs. Some operations may be executed on a first computing device while other operations may be executed on a second computing device, such that the functions of the analytics server 318 are distributed among the various computing devices. For instance, some operations may be executed on the customer device 302 and others may be executed by the analytics server 318, such that the workload and functionality are distributed between or otherwise result from execution by various devices of the system 300.

The platform database 308 stores and manages data records concerning various aspects of the e-commerce platform 306, including information about, for example, actors (e.g., merchants, customers, or platform administrators), electronic devices, merchant offerings (e.g., products, inventory, or services), delivery methods, various metrics and statistics, machine-learning models, merchant pages hosting merchant stores, and other types of information related to the e-commerce platform 306 (e.g., usage and/or services).

The customer memory 332 or the platform database 308 may also include various libraries and data tables including detailed data needed to perform the methods described herein, such as revising the merchant's online store. For instance, the customer device 302 or the analytics server 318 may generate a data table associated with different products offered by different merchants and/or merchants' online stores. In another example, the customer device 302 or the analytics server 318 may generate and periodically update a customer profile associated with different customers where data records within the customer profile include data associated with different customers (e.g., historical purchases, purchase preferences, and/or payment information). For instance, different products offered by a merchant can be stored, such that they can be dynamically presented to different customers in accordance with their preferences and purchase history.

The customer profile data may be stored on the customer memory 332 or the platform database 308 and may include the data for the customer's physical spaces, sub-space regions of the physical spaces, including the virtual objects and media data from which the customer device 302 or the analytics server 318 generated the virtual environments.

The merchant profile data may include the data for the objects offered by the merchant, which may include virtual objects for the merchant's objects and/or object attribute data (e.g., dimensions, colors) from which the customer device 302 or the analytics server 318 may reference to generate the virtual objects.

Various predetermined rules, regulations, and thresholds discussed herein may be set by the customer device 302, the customer, the analytics server 318, or a system administrator of the e-commerce platform 306. Additionally or alternatively, the customer operating the customer device 302 and/or the merchant server 340 may input or modify the predetermined rules.

The platform database 308 may be hosted on any number of computing devices having a processor (sometimes referred to as a database (DB) processor 320) and non-transitory machine-readable memory configured to operate as a DB memory 310 and capable of performing the various processes and tasks described herein. For example, one or more analytics servers 318 may host some or all aspects of the platform database 308.

A computing device hosting the platform database 308 may include and execute database management system (DBMS 314) software, though a DBMS 314 is not required in every potential embodiment. The platform database 308 can be a single, integrated database structure or may be distributed into any number of database structures that are configured for some particular types of data needed by the e-commerce platform 306. For example, a first database could store customer credentials and be accessed for authentication purposes, and a second database could store raw or compiled machine-readable software code (e.g., HTML, JavaScript) for webpages such that the DB memory 310 is configured to store information for hosting webpages.

The computing device hosting the platform database 308 may further include a DB network interface 324 for communicating via platform networks of the e-commerce platform 306. The structure of the DB network interface 316 will depend on how the hardware of the platform database 308 interfaces with other components of the e-commerce platform 306. For example, the platform database 308 may be connected to the platform network with a network cable. The DB network interface 324 may include, for example, a NIC, a computer port, and/or a network socket. The processor 320 directly performs or instructs all of the operations performed by the platform database 308.

Non-limiting examples of such operations may include processing queries or updates received from the analytics server 318, customer device 302, and/or merchant server 340; preparing information for transmission via the platform network and/or the external networks. The processor 320 may be implemented by one or more processors that execute instructions stored in the DB memory 310 or other non-transitory storage medium. Alternatively, some or all of the DB processor 312 may be implemented using dedicated circuitry such as an ASIC, a GPU, or a programmed FPGA.

The customer memory 332 or the DB memory 310 of the platform database 308 may contain data records related to, for example, customer activity, and various information and metrics derived from web traffic involving customer accounts. The data may be accessible to the customer device 302 or the analytics server 318. The customer device 302 or the analytics server 318 may issue queries to the platform database 308 and data updates based upon, for example, successful or unsuccessful authentication sessions.

The analytics server 318 may be any computing device that comprises a processor 320 and non-transitory machine-readable storage media (e.g., server memory 326) and that is capable of executing the software for one or more functions descried herein, such as the spatially aware media engine 322 in addition to or as an alternative to the media engine 322 executed by the customer device 302. In some cases, the customer memory 332 or the server memory 326 may store or otherwise contain the computer-executable software instructions, such as instructions needed to execute the spatially aware media engine 322. The software and hardware components of the analytics server 318 enable the analytics server 318 to perform various operations that serve particular functions of the e-commerce platform 306.

For example, the analytics server 318 that serves as a webserver may execute various types of web server software (e.g., Apache® or Microsoft IIS®). As another example, the analytics server 318 may cause the merchant's online store to be revised in accordance with the methods described herein. The analytics server 318 may either directly revise the online store or instruct the merchant server 340 or any other webserver to revise the online store accordingly. It is intended that these are merely examples and not intended to be limiting as to the potential arrangements or functions of the analytics server 318. Non-limiting examples of the analytics server 318 may include desktop computers, laptop computers, and tablet devices, among others.

The analytics server 318 or application 342 of the customer device 302 may execute the spatially aware media engine 322 that directly or indirectly updates the graphical user interface 338. The spatially aware media engine 322 may be executed by the customer device 302 and/or by the analytics server 318 where some or all of the operations of the spatially aware media engine 322 may be performed locally on the customer device 302 or in the e-commerce platform 306. In operation, the spatially aware media engine 322 may transmit or generate an instruction that causes the application 342 to present one or more virtual objects representing real world objects (e.g., products offered by the merchant) in a virtual reality (VR) and/or augmented reality (AR) layer displayed on the graphical user interface 338 of the customer device 302.

Additionally or alternatively, the spatially aware media engine 322 could be provided by the e-commerce platform 306 as a separate web-based or cloud-based service accessible by the customer device 302 executing the browser 332. In some implementations, the spatially aware media engine 322 is implemented at least in part by the customer device 302 and/or the merchant server 340. Other implementations of the spatially aware media engine 322 are also contemplated, such as a stand-alone service to dynamically generate the virtual objects in a VR or AR representation of the environment. The spatially aware media engine 322 may be executed by the customer device 302 or the e-commerce platform 306 and is shown as a single component of the customer device 302 and the e-commerce platform 306, the spatially aware media engine 322 could be provided by multiple different components of the system 300 that are in networked communication with the customer device 302 or the analytics server 318 executing the spatially aware media engine 322. The spatially aware media engine 322 is further described with respect to FIG. 9.

The merchant server 340 may be any server associated with a merchant hosting an online store. The merchant server 340 may be any computing device hosting a website (or any other electronic platform) accessible to customers (e.g., operating the customer device 302) via the network 328. The merchant server 340 may include a processing unit and non-transitory machine-readable storage capable of executing various tasks described herein. The processing unit may include a processor with a computer-readable medium, such as a random access memory coupled to the processor. Non-limiting examples of the processor may include a microprocessor, an application-specific integrated circuit, and a field programmable object array, among others. Non-limiting examples of the merchant server 340 may include workstation computers, laptop computers, server computers, laptop computers, and the like. While the system 300 includes a single merchant server 340, in some embodiments the merchant server 340 may include a number of computing devices operating in a distributed computing environment.

The merchant server 340 may be configured to interact with one or more software modules of the same or different types depicted within the system 300. For instance, the merchant server 340 may execute software applications configured to host an electronic platform that may generate and serve various webpages to the customer device 302. The electronic platform may also embed various graphical user interfaces generated by the analytics server 318. The online store hosted by the merchant server 340 may be configured to require user authentication based upon a set of user authorization credentials (e.g., username, password, biometrics, cryptographic certificate, and the like).

Methods and Systems for VR/AR Displays

FIGS. 4-11, and their corresponding description, depict and describe how a server (e.g., analytics server) or customer device generates and displays a VR, AR, or mixed-reality presentation at a graphical user interface. A customer device may capture, generate, and/or upload media data (e.g., image data, video data, LIDAR data) containing images of a sub-space region (e.g., living room) of a physical space (e.g., house). The images of the region include depictions of real world objects (e.g., couch, coffee table, picture frames) and other attributes (e.g., walls, floors, dimensions, colors) of the region. In some implementations (e.g., VR operations), the server or customer device may generate a virtual environment representing the region and virtual objects representing the real world objects, where the virtual objects are situated in the virtual environment as the real world objects are situated in the image(s) of the region. In some implementations (e.g., AR operations), the customer device may stream the images as a video feed from a camera to the graphical user interface of the customer device. The customer device may receive data or instructions for generating and situating a virtual object representing a real world object in the AR environment presented on the graphical user interface.

The server and/or the customer device receive or generate spatially aware media for the region and spatially aware media information about the region, based upon the one or more images received. The spatially aware media may include, for example, any media data containing the images of the region (e.g., image data, video data, LIDAR data) and attributes of the region and/or objects, such as 3D spatial information identifying the position, size, and shape of 3D surfaces in the region. The server and/or customer device may refer to the spatially aware media for performing various VR/AR operations described herein.

The images may persist on any non-transitory media (e.g., memory of customer device, memory of server, memory database) and any machine-readable format, including still image data formats (e.g., JPG, GIF), video data formats (e.g., MOV, MP4) for discrete videos, video media streaming formats for video media data streaming from a camera, or LIDAR data. The images described here should not be construed as limiting on the number of images used for the processes discussed here, as any number of images of the particular physical space or sub-space region may be used. Similarly, the images described here should not be construed as limiting on the number of virtual environments or AR-enriched images that may be generated.

The spatially aware media may be generated using any number of images and is not limited to being a single image. In some embodiments, spatially aware media may be based upon multiple different images of a real-world sub-space region captured from various different perspectives or viewpoints; and the spatially aware media may be generated according to attributes (e.g., 3D spatial information) to augment or generate a continuous AR display or VR environment. The 3D spatial information generated for the spatially aware media may be generated and relate to all of the source images. For example, multiple source images of a real-world sub-space region may each be mapped to a continuous AR display or VR environment generated for the real-world sub-space region. The multiple source images may contain overlapping real-world attributes, causing the AR or VR operations to generate the same attributes (e.g., 3D spatial information) to produce the continuous spatially aware media across the real-world sub-space region.

The spatially aware media used to generate the augmented display of a camera feed (in AR operations) or the virtual environment (in VR operations) for the sub-space region, enables the customer to view virtual objects representing real-world objects in the AR or VR display. For instance, the graphical user interface may display a virtual preview object of a real-world object that the customer is considering for purchase within the AR or VR display. The preview object may be virtually positioned within the real-world sub-space region based on the attributes of the previous object as generated to represent the real-world object, such as color, dimensions, or other 3D spatial information (e.g., position within a 3D coordinate system, position within the real-world sub-space region).

In the AR operations, the customer device or server may augment the source image data (e.g., video, sill image, LIDAR data) with a visual rendering of the preview object, where customer device situates the preview object with a 3D position based upon, for example, the perspective of the graphical user interface display and relative to any attributes, real-world objects, and/or surfaces recognized in the source image data.

In VR operations, the server may apply the various functions for building a virtual environment (e.g., computer vision, object recognition) on the source image data depicting the real-world sub-space region and the real-world objects therein. The customer device may retrieve this data from the database and display the virtual environment via the graphical user interface. The customer device may retrieve or generate the visual rendering of the preview object, where the customer device situates the preview object with a 3D position based upon, for example, the perspective of the graphical user interface display and relative to any attributes, extant virtual objects in the virtual environment recognized in the source image data.

Example configurations may be found in U.S. application Ser. Nos. 17/670,178, 17/670,203, entitled "Augmented Reality Enabled Dynamic Product Presentation," filed Feb. 11, 2022, each of which is incorporated by reference in its entirety.

Figure 4:
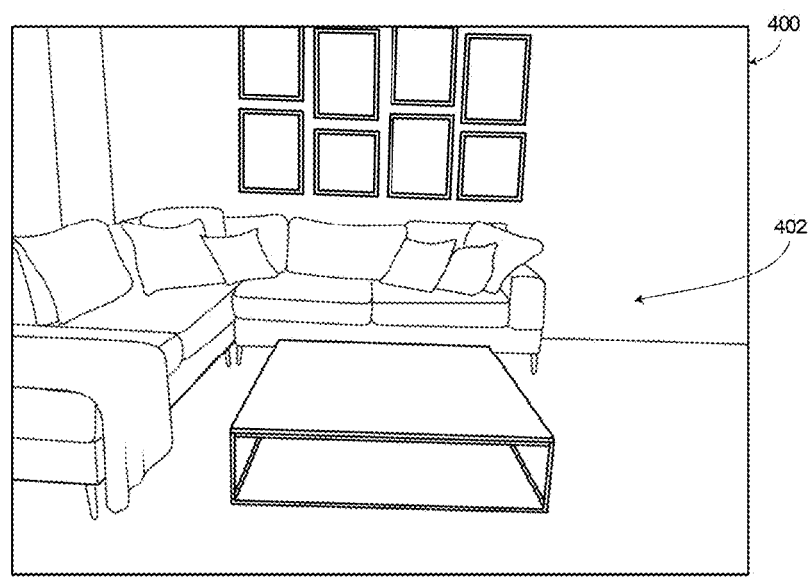
FIG. 4 illustrates an image of a sub-space region of a physical space as captured by camera of a customer device, according to an embodiment.

FIG. 4 illustrates an image 400 of a sub-space region (e.g., living room 402) of a physical space (e.g., house) as captured by camera of a customer device. The media data containing the image 400 forms a portion of the spatially-aware media associated with the living room 402. The spatially aware media further includes, for example, the 3D spatial information identifying the position, size, and shape of 3D surfaces in the living room 402. It should be noted that, as used herein, a position may include both a location and an orientation. The image 400 is a non-limiting example of media data containing a visual depiction of the living room 402.

Figure 5:
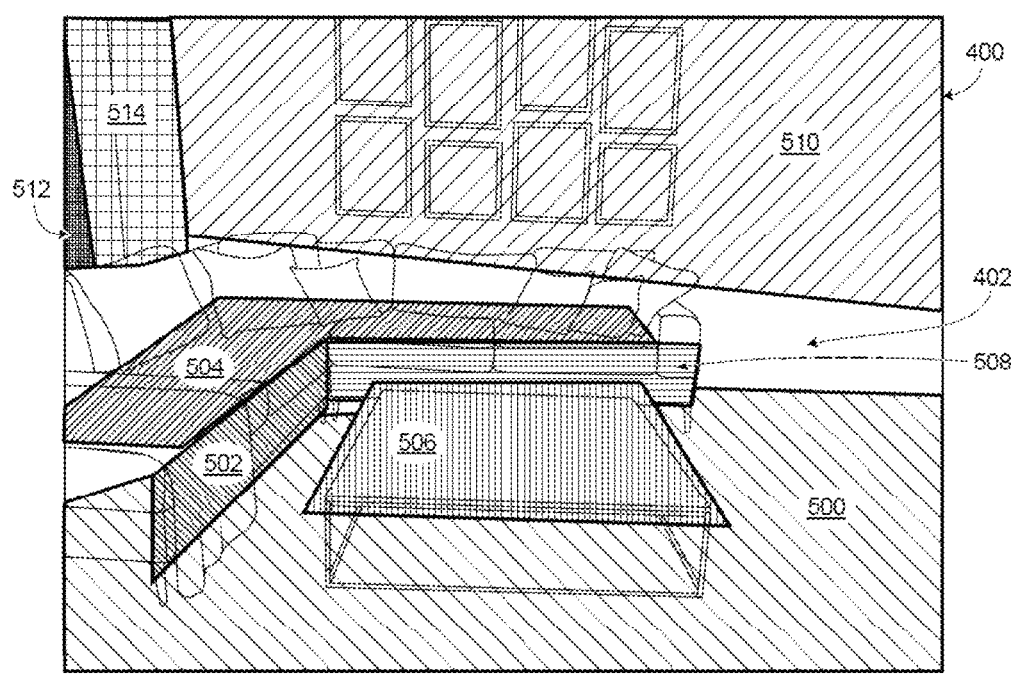
FIG. 5 illustrates an image on which processes identified various attributes and spatial features of a sub-space region, according to an embodiment.

FIG. 5 illustrates the image 400 in which the customer device (or server) executed one or more processes for identifying various 3D surfaces 500-514 as types of attributes of the living room 402, where FIG. 5 depicts hatching or cross-hatching representing the identified surfaces 500-514 other types of attributes (e.g., barriers, walls). The customer device may use a variety of techniques to identify various surfaces within the image 400, which may include the surfaces of the real world objects (e.g., couch 504, coffee table 506) and the surfaces defined by physical attributes of the region (e.g., living room 402), such as the walls 510 and the floor 500. For instance, the customer device may use a feature-based mapping technique that allows for recognition of the planar surfaces, such as the walls 510, tables 506, the floor 500, counters, or other planar surfaces. The customer device or server may identify the various attributes of each surface 500-514 and/or objects using various computer vision and object recognition operations. In some cases, the customer device or a database may store any number of these surfaces 500-514 as 3D spatial information with the spatially aware media associated with the living room 402. In this way, the image 400 is made "spatially aware" by the 3D spatial information identifying the surfaces 500-514.

Augmenting the spatially aware media can allow the customer to view and interact with the virtual objects representing real-world objects when the customer is unable to physically or practically interact with the real-world object. The software AR operations executed by the customer device may augment the spatially aware media, which may include superimposing or overlaying virtual objects onto the image 400 depicting the real-world region. The customer device may then generate the augmented display on the graphical user interface. In AR operations, the image 400 may be a real-world depiction of the sub-space region (e.g., living room 406) of the customer's physical space (e.g., home), allowing the customer to preview the aesthetic of a real-world object in the region.

The AR operations instruct the customer device (or server) to augment the spatially aware media of the image 400 to include virtual content, such as virtual previews of real world objects that the customer is considering to purchase. For instance, the customer device may augment the image 400 of the living room 402 to include a preview object (e.g., virtual picture frame 602 in FIG. 6) as a virtual object representing a real world picture frame. In some embodiments, the customer device augments the spatially aware media for the image 400 of the living room 402 by overlaying a render or a 3D representation including the preview object onto the image 400 of the living room 402 that is provided by the spatially aware media. Notably, for AR operations, the image 400 is a live feed or direct image feed from the camera (or other optical sensor) depicting the living room 402 (as opposed to being a virtual environment representing the living room 402). The preview object may be defined relative to the 3D spatial features of the real-world sub-space region of the living room 402 as indicated by the spatially aware media. For example, AR software operations may determine a position in which to situate the preview object within a 3D coordinate system that has been mapped to the real-world sub-space region (e.g., living room 402). The customer device may generate or retrieve a 3D virtual rendering visually depicting the preview object and situate the preview object according to the determined position and the perspective or viewpoint of the image 400. The customer device may update and augment the graphical user interface displaying the image 400 of the real-world depiction of the living room 402 to include the preview object.

The preview object may also be virtually movable by the customer according to various types of user inputs (e.g., touch-based, voice inputs). The customer device moves or repositions the preview object in the augmented display relative to the real-world sub-space region. In some implementations, moving the preview object may instruct the customer device to modify or generate further instances of the spatially aware AR/VR media data, which includes the render of the virtual preview object at the new positions. The terms "augmented media," "augmented display," and "spatially aware AR/VR media data" are generally used interchangeably herein.

The AR operations may virtually position the preview object on a particular surface 500-514 of the real-world depiction of the living room 402 in the image 400. The customer device may position the preview object in the augmented display based upon various positioning configurations, the attributes of the preview object, and/or the attributes of the region (e.g., living room 402). In some embodiments, the customer device may be preconfigured to situate the preview object in a default position (e.g., center of the region), or may be preconfigured to situate the preview object in an appropriate location (e.g., place the preview object on a table and not on a sofa). Additionally or alternatively, the graphical user interface may enter a touch-based input to "hold" and "drop" the preview object within a particular, user-selected position within the augmented display of the region.

In some embodiments, the customer device may maintain contextual awareness of the real-world objects and/or surfaces 500-514 in the region according to the 3D coordinate system and/or the recognized real-world objects, allowing the customer device to situate the preview object relative to the other objects recognized in the image 400 containing the real-world depiction of the living room 402. In this way, the customer device may avoid "collisions" or unrealistic placements of the preview object in the augmented display among the real-world objects and surfaces 500-514. In some embodiments, the customer device may position the preview object in the augmented display based upon the attributes (e.g., size, orientation) of the render of the preview object may realistically portray the preview object situated on the particular surface 500-514.

Generating and presenting the customer with a virtual environment representing the sub-space region may also allow the customer to view and interact with the virtual objects when the customer is unable to physically or practically interact with the real-world objects and/or the customer is unable to physically or practically capture the image media data used for the AR operations. In some circumstances, the customer may have personal mobility challenges moving around the sub-space using the AR operations and interact with the augmented representation, or the customer may not want to move around the sub-space (e.g., hands are full; disinclined to get up). In such circumstances, the customer may use the VR operations and interact with the virtual environment, rather than use the AR operations to interact with the augmented environment. The VR operations executed by the customer device or server may apply the various computer vision or object recognition functions on the media data of the region 402 to, for example, recognize the attributes of the region 402, the real-world objects, and/or the surfaces 500-514. Based on the analysis of the media data for the region 402, the VR operations may generate a virtual environment representing the region 402 and virtual objects representing the real-world objects identified in the region 402. The customer device or server may store the virtual environment and virtual objects into the database as spatially aware media associated with the region 402.

When the customer device receives instructions via user inputs (e.g., touchscreen inputs, spoken inputs) to view the region 402, the customer device or server may retrieve the data for the virtual environment from the database. The customer device generates or updates the graphical user interface to display the image 400 depicting the virtual environment representing the region 402, including the 3D rendering of the virtual objects. In some cases, the customer may preview the aesthetic of a real-world object in the region 402 by viewing a virtual preview object representing the real-world object situated in the virtual environment.

As an example, the customer device may display the image 400 of the living room 402 to include a preview object (e.g., virtual picture frame 602 in FIG. 6) as a virtual object representing a real world picture frame. The preview object may be defined relative to the 3D spatial features of the real-world sub-space region of the living room 402 as indicated by the spatially aware media. For example, computer vision, object recognition, and/or VR operations may determine a position in which to situate the preview object within a 3D coordinate system that has been mapped from the real-world region 402 to the virtual environment representing the region 402. The customer device may generate or retrieve the 3D virtual rendering visually depicting the preview object and situate the preview object according to the determined position and the perspective or viewpoint of the image 400. The customer device may update the graphical user interface displaying the image 400 of the virtual environment of the living room 402 to include the preview object.

The preview object, and/or other virtual objects, may also be virtually movable by the customer according to various types of user inputs (e.g., touch-based, voice inputs). The customer device moves or repositions the preview object in the virtual environment. In some implementations, moving the preview object may instruct the customer device to modify or generate further instances of the spatially aware media for the region 402.

The VR operations may position the preview object in a virtual environment or on a particular surface 500-514 of existing virtual objects. The customer device may position the preview object in the virtual environment based upon various positioning configurations, the attributes of the preview object, and/or the attributes of the region 402. In some embodiments, the customer device may be preconfigured to situate the preview object in a default position (e.g., center of the region), or may be preconfigured to situate the preview object in an appropriate location (e.g., place the preview object on a table and not on a sofa). Additionally or alternatively, the graphical user interface may enter a touch-based input to "hold" and "drop" the preview object within a particular, user-selected position within the virtual environment.

In some embodiments, the customer device may maintain contextual awareness of the virtual objects in the virtual environment according to the 3D coordinate system, allowing the customer device to situate the preview object relative to the other virtual objects. In this way, the customer device may avoid "collisions" or unrealistic placements of the preview object in the virtual environment. In some embodiments, the customer device may position the preview object in the virtual environment based upon what the attributes (e.g., size, orientation) of the render of the preview object may realistically portray with the preview object being situated at a particular position in the 3D coordinate system.

Figure 6:
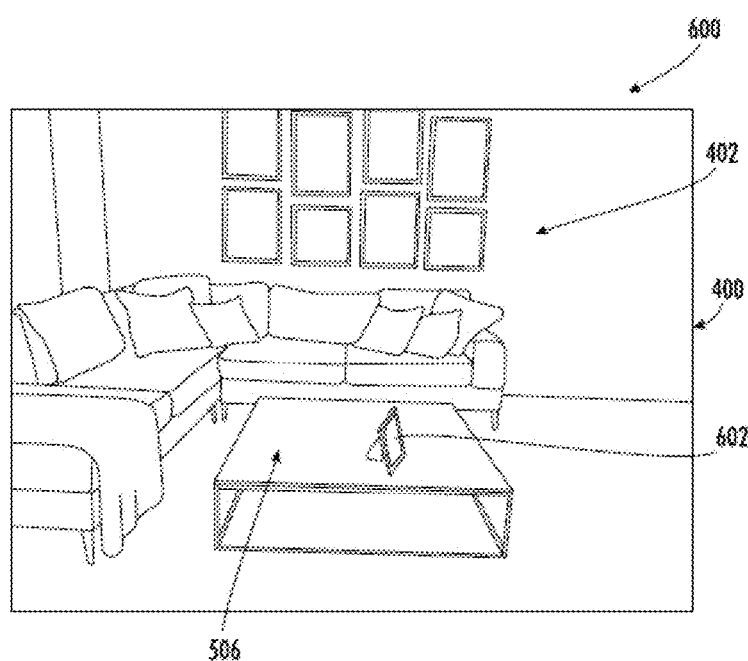
FIGS. 6-7 illustrate example rendering of a virtual scene generated according to the AR or VR operations, as executed by the customer device or the server, according to an embodiment.
Figure 7:
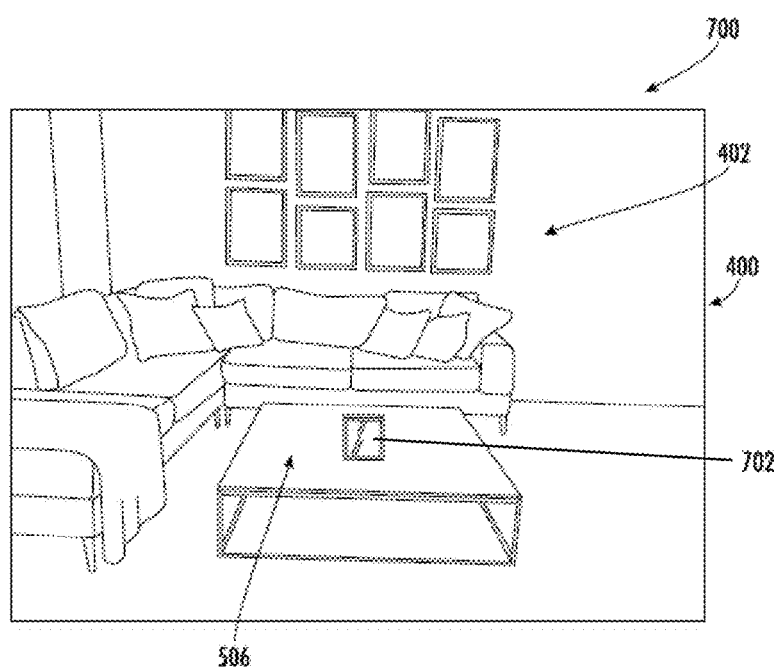

FIGS. 6-7 illustrate example renderings of virtual scenes 600, 700 generated according to the AR or VR operations, as executed by the customer device or the server.

For embodiments involving AR operations, the renderings of virtual scenes 600, 700 are generated to display spatially aware AR/VR media data associated with the living room 402. The virtual scene 600 of spatially aware AR/VR media data includes the image 400 overlaid with a preview object 602 (e.g., picture frame). The preview object 602 is a 3D rendering depicting the picture frame resting on the surface 506 of the living room 402, corresponding to a real-world table of the living room 402. The customer device may virtually position the preview object 602 on the surface 506 detected in the video feed of the living room 402, using the 3D spatial information included in the spatially aware media for the living room 402. The customer device may include the preview object 602 based upon the position of the preview object 602 relative to the viewpoint of the image 400 and/or based on the various positioning configurations governing the AR operations. The virtual scene 700 of the spatially aware AR/VR media data includes the video feed image 400 overlaid with the preview object 702 (e.g., picture frame) situated at a comparatively different position than the preview object 602 in the 3D coordinate system. In some implementations, the preview object 702 is a render of the picture frame after the preview object 702 has been virtually positioned or repositioned in response to customer inputs. For instance, the customer may have entered a touch-based or spoken instruction to the customer device to move and reposition where the preview object 702 is situated relative to the attributes (e.g., 3D spatial features, other virtual objects) of the living room 402. In this way, the virtual scene 700 containing spatially aware AR/VR media data may be considered an updated instance of the virtual scene 600.

For embodiments involving VR operations, the virtual scene 600, 700 are generated to display spatially aware AR/VR media data associated with the living room 402. The virtual scene 600 of spatially aware AR/VR media data includes a VR virtual environment representing the sub-space region 402 allowing the customer to view and interact with the virtual objects 506, 602, 702. The VR operations executed by the customer device or server may apply the various computer vision or object recognition functions on the media data of the region 402 to, for example, recognize the attributes of the region 402, the real-world objects, and/or the surfaces 500-514. The customer device may receive instructions via user inputs (e.g., touchscreen inputs, spoken inputs) to view the region 402 with a preview object 702 (to preview a picture frame in the living room). The customer device or server may retrieve the data for the virtual environment from the database for the region 402. The customer device generates or updates the virtual scene 600, 700 to display the virtual environment representing the region 402, including the 3D rendering of the virtual objects 506, 602, 702. In some cases, the customer may preview the aesthetic of a real-world object in the region 402 by viewing a virtual preview object representing the real-world object situated in the virtual environment. As an example, the virtual scene 600, 700 may display the virtual environment of the living room region 402 to include a preview object 602, 702 (e.g., virtual picture frame) as a virtual object representing a real world picture frame. The preview object 602, 702 may be defined relative to the 3D spatial features of the real-world sub-space region of the living room 402 as indicated by the spatially aware media. For example, computer vision, object recognition, and/or VR operations may determine a position in which to situate the preview object 602, 702 within a 3D coordinate system that has been mapped from the real-world region 402 to the virtual environment representing the region 402. The customer device may generate or retrieve the 3D virtual rendering visually depicting the preview object and situate the preview object 602, 702 according to the determined position and the perspective or viewpoint. The customer device may update the virtual scene 600, 700 displaying the virtual environment of the living room region 402 to include the preview object 602, 702.

Figure 8:
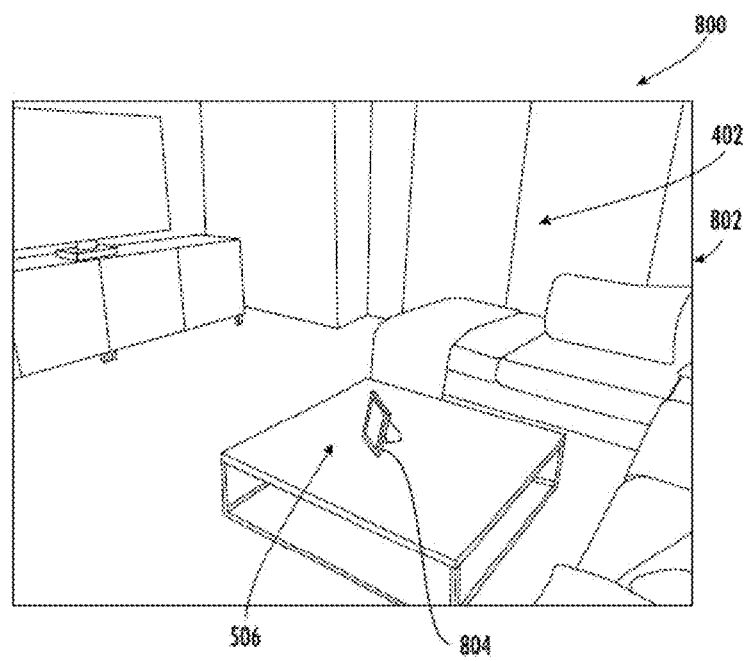
FIG. 8 illustrates an example graphical user interface generated according to the AR or VR operations, as executed by the customer device or the server, according to an embodiment.

FIG. 8 illustrates an example rendering of a virtual scene 800 generated according to the AR or VR operations, as executed by the customer device or the server. The virtual scene 800 displays the AR or VR representation of the living room sub-space region 402 from a comparatively different perspective angle shown by FIGS. 4-8.

For embodiments involving AR operations, the customer device generates the virtual scene 800 using the spatially aware AR/VR media data for an image 802 of the camera feed depicting another perspective of the real-world depiction of the living room 402, where the customer device augmented the image 802 to include the preview virtual object 804 representing the picture frame situated on the coffee table surface 506. The attributes (e.g., 3D spatial features) of the living room 402 and real-world objects may be identified by the spatially aware media engine, which may include recognizing the real-world objects and/or the surfaces 500-514, as shown and described in FIG. 5, and mapping the recognized objects, attributes, and/or surfaces to the 3D coordinate system for the image 802.

In some implementations, the objects or other attributes may have a corresponding position defined within the 3D coordinate system that is mapped to the living room 402 and stored as various types of positional information by the spatially aware media engine for the living room 402. Such positional information may include, for example, 3D coordinates, 3D orientation, and a perspective angle of viewing (point of view) into the living room 402 and the preview object 804. As shown in FIG. 8, the image 802 is augmented to include the overlay for the preview object 804 (virtual rendering of the picture frame) resting on the real-world depiction of the coffee table surface 506. The preview object 804 is the 3D rendering situated within the living room 402 according to the same position (e.g., same 3D coordinate and 3D orientation values) as the preview object 702 in FIG. 7, but the virtual scene 800 displays the image 802 of the region 402 from a different perspective angle viewpoint.

The movement of a preview object 804 may be tracked across multiple images provided by spatially aware media. For example, in the case that customer input generates an instruction to move the virtual object of the picture frame from the position shown by the representation 602 of FIG. 6 to the position shown by the representation 702 of FIG. 7, both of the images 400 and 802 may be augmented to depict the new position of the virtual object.

In some implementations, multiple images provided by spatially aware media correspond to different frames of a video capturing a real-world sub-space region, such as a camera feed associated with a customer device. By way of example, the images 400 and/or 802 might be different frames of a video of the living room 402. After augmenting the different frames to include respective renders of a virtual object, the virtual object would appear to be in the same position within the real-world sub-space region in the augmented video. Virtually moving the virtual object within one frame of the video may also be reflected in all of the other frames.

Spatially Aware Media Engine

The discussion below with respect to FIGS. 9-11 includes embodiments implementing one or more spatially aware media engines. The embodiments include systems and methods involving devices executing the spatially aware media engines as software programming for performing various software functions of the VR and/or AR operations, including generating and storing spatially aware media data or generating aspects of the graphical user interfaces that display AR-enriched augmented images or VR experiences for virtual environments. While some implementations of these systems and methods are described in the context of commerce applications, it should be noted that the present disclosure is in no way limited to commerce. The systems and methods disclosed herein may also be implemented in any other application of spatially aware media.

As mentioned, example configurations may be found in U.S. application Ser. Nos. 17/670,178, 17/670,203, entitled "Augmented Reality Enabled Dynamic Product Presentation," filed Feb. 11, 2022, each of which is incorporated by reference in its entirety.

Figure 9:
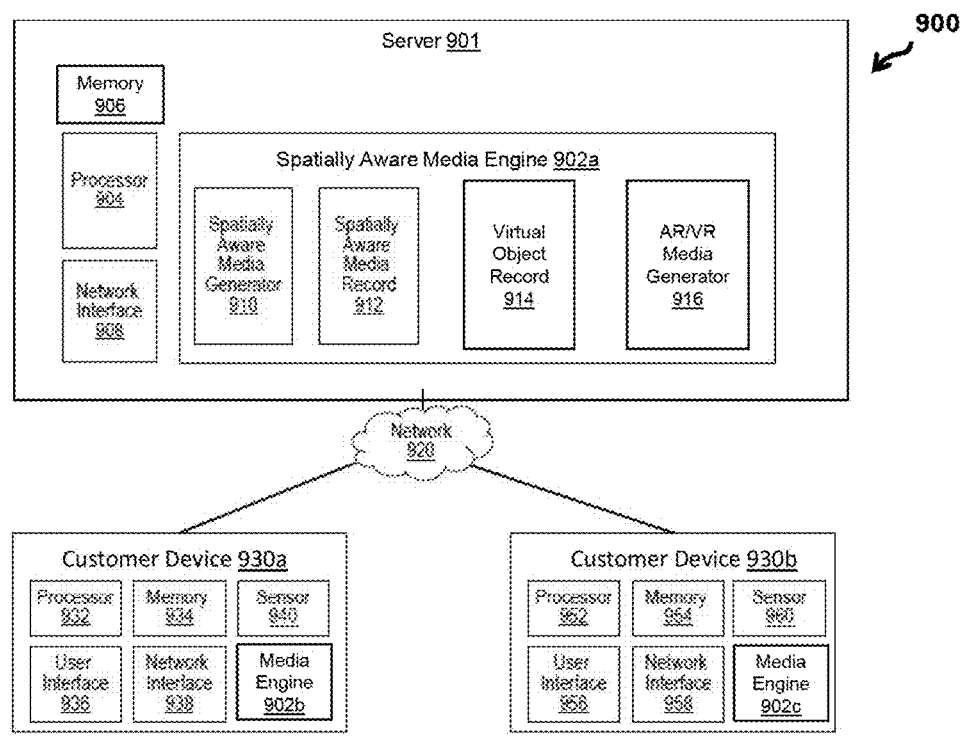
FIG. 9 is a block diagram illustrating a system for implementing spatially aware media for AR and/or VR operations, according to an embodiment.

FIG. 9 is a block diagram illustrating a system 900 for implementing spatially aware media for AR and/or VR operations. The system 900 includes a server 901 and any number of customer devices 930a, 930b (sometimes referred to collectively as customer device 930 or customer devices 930) communicating via one or more public and/or private networks 920. The software and hardware components of the network 920 may implement any number of communications protocols and/or telecommunications protocols. Non-limiting examples of such protocols include a local area network (LAN), a wireless LAN, an internet protocol (IP) network, and a cellular network.

As shown, the server 901 and the customer devices 930 each comprises a spatially-aware media engine 902a, 902b, 902c (sometimes referred to collectively as spatially-aware media engine 902 or spatially-aware media engines 902). In some embodiments, only the server 901 executes a spatially-aware media engine 902. In some embodiments, one or more customer devices 930 execute a spatially-aware media engine 902, in addition to or as an alternative to the server 901 executing a spatially-aware media engine 902. As an example, the server 901 may execute the spatially-aware media engine 902a for VR operations to enroll (e.g., generate and store) virtual environments representing various sub-space regions of a customer's physical space. A particular customer device 930a may execute the spatially-aware media engine 902b to perform AR operations to augment image data of a camera feed of the customer device 930a, and/or perform VR operations to retrieve, display, and control one of the customer's interactive virtual environments according to the customer's instructions. Embodiments may include any number of permutations in which the server 901 and customer devices 930 execute the AR and VR operations. A software application or instance may be installed on the customer device 930 that includes the spatially-aware media engine 902, allowing the software application to generate, store, and/or modify the spatially aware media locally, for the AR or VR operations.

The server 901 includes the spatially aware media engine 902, a processor 904, memory 906, and a network interface 908. The processor 904 may be implemented by one or more hardware processing devices (e.g., CPU) that execute instructions stored in the memory 906 or another non-transitory computer-readable medium. Alternatively, some or all of the processor 904 may be implemented using dedicated integrated circuitry, such as an ASIC, a GPU, or a programmed FPGA.

The network interface 908 is provided for communication over the network 920. The structure of the network interface 908 is implementation-specific. For example, the network interface 908 may include a NIC, a computer port, and/or a network socket. The memory 906 stores various forms of data and software instructions, such as the spatially aware media engine 902 and various sub-components of the spatially aware media engine 902 (e.g., a spatially aware media generator 910, a spatially aware media record 912, a virtual object record 914, and an AR/VR media generator 916).

The spatially aware media engine 902 includes a spatially aware media generator 910 that employs and/or implements one or more algorithms (possibly in the form of software instructions executable by the processor 904) that are capable of generating spatially aware media. The spatially aware media data associated with the living room 402 of FIGS. 4-8 are examples of spatially aware media that may be generated using the spatially aware media generator 910. In general, spatially aware media can be generated in several different ways.

The customer devices 930 may enable respective customers to engage with spatially aware media. Non-limiting examples of a customer device 930 includes a mobile phone, tablet, laptop, projector, headset, and computer. The customer devices 930 may be owned and/or operated by a customer or may be a merchant device that is owned and/or operated by a merchant, for example.

The customer device 930 includes a processor 932, memory 934, user interface 936, network interface 938, sensor 940, and the spatially aware media engine 902. The spatially aware media engine 902b, 902c of the customer devices 930a, 930b may include some or all of the sub-components and functions as described with respect to the spatially aware media engine 902a of the server 901.

The user interface 936 may include, for example, a display screen (e.g., touchscreen), a gesture recognition system, a speaker, headphones, a microphone, a haptic device, a keyboard, and/or a mouse. In some embodiments, the user interface 936 may be at least partially implemented by wearable devices embedded in clothing and/or accessories, for example. The user interface 936 can present content to a customer, including visual, haptic, and audio content. In addition, the user interface 936 may receive and interpret various types of customer instructions or inputs. For instance, an interactive touch-sensitive display screen may receive and interpret the customer's touch-based inputs into executable commands. As another example, the microphone may receive analog audio signals from the customer's voice and convert the analog signals into an electrical signal, which the software of the user interface 936 and/or the processor 932 recognize as the customer's speech-based inputs and interpret into executable commands.

The network interface 938 is provided for communicating over the network 920. The structure of the network interface 938 will depend on how the customer device 930 interfaces with the network 920. For example, if the customer device 930 is a mobile phone, headset, or tablet, then the network interface 938 may include a transmitter/receiver with an antenna to send and receive wireless transmissions to/from the network 920.

The processor 932 directly performs or instructs all of the operations performed by the customer device 930. Examples of these operations include processing customer inputs received from the user interface 936, preparing information for transmission over the network 920, processing data received over the network 920, and instructing a display screen to display information. The processor 932 may be implemented by one or more processors that execute instructions stored in the memory 934.

The sensor 940 may be provided to obtain measurements of a real-world sub-space region. These measurements may be used to detect, recognize, characterize, or otherwise identify attributes and 3D spatial features of the real-world sub-space region. The sensor 940 may include one or more cameras, microphones, haptic sensors (e.g., vibration and/or pressure sensors), radar sensors, LIDAR sensors, and sonar sensors, for example. Although the sensor 940 is shown as a component of the customer device 930, the sensor 940 may also or instead be implemented separately from the customer device 930 and may communicate with the customer device 930 and/or the spatially aware media engine 902 via wired and/or wireless connections, for example.

The spatially aware media engine 902 supports the generation, storage and/or augmentation of spatially aware media. In some embodiments, the spatially aware media could be output from the spatially aware media engine 902 for presentation on any number of customer devices 930.

In some implementations, a spatially aware media engine 902 is provided at least in part by a cloud-based or platform service hosted on the server 901, such as an embodiment of the e-commerce platform hosted on analytics servers as depicted in FIG. 3. For example, a spatially aware media engine 902 could be provided as a core function of the e-commerce platform or as an application or service supported by or communicating with the e-commerce platform. In some implementations, a spatially aware media engine 902 is implemented at least in part by a customer device 930, such as a customer device or a merchant device. In some implementations, a spatially aware media engine 902 is implemented as a stand-alone service to generate, store, and/or modify spatially aware media. While the spatially aware media engine 902 is shown as a single component, a spatially aware media engine 902 could instead be provided by multiple different components that are in communication via a network.

Various types of image media data, object data, virtual object data, attributes, and 3D spatial information may be included in the spatially aware media, as generated by the spatially aware media engine 902. Some or all of this data may be stored together into a data record (spatially aware media record 912) of a database (e.g., platform database 308) or other non-transitory storage medium (e.g., memory 906, memory 934).

Figure 10:
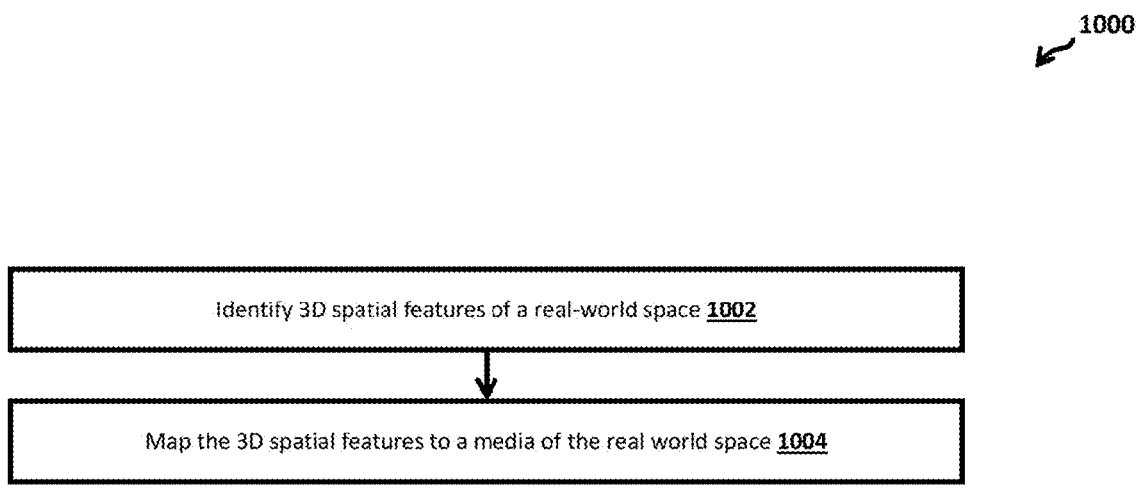
FIG. 10 is a flow diagram illustrating an example method for generating spatially aware media and AR/VR media data, according to an embodiment.

FIG. 10 is a flow diagram illustrating an example method 1000 for generating spatially aware media and AR/VR media data, which will be described as being performed by the spatially aware media engine 902 executed by a computing device (e.g., customer device 930, server 901). For example, the spatially aware media engine 902 may include instructions that, when executed by a processor 904, 932 of the computing device, causes the processor 904, 932 to perform the method 1000. Some or all portions of the method 1000 may be performed on various computing devices, such as a server 901 and a customer device 930, having the software and hardware components for performing the various functions described here.

The computing device may execute the method 1000 to analyze source image data (e.g., camera feed received via a camera or other sensor 940 of a customer device 930), in order to recognize and map various attributes and real-world objects of a real-world sub-space region depicted in the source image.

In some embodiments, based on analyzing the source image, the customer device may display an additional layer (e.g., AR overlay) to augment the source image data. For instance, the customer device 930 may overlay a rendering of a 3D virtual object representing a real-world object onto the source image to display the augmented image. For instance, the customer device 930 may analyze the source image data from the camera feed, as received from the camera, recognize attributes and spatial information of the real-world sub-space depicted in the source image data, and then overlay a virtual image of, for example, a picture frame positioned at a suitable surface depicted within the source image. In some embodiments, the server may execute the method 1000 to analyze the source image data received from the camera in order to generate a virtual environment representing the real-world sub-space region in the source image and virtual objects representing the real-world objects recognized in the source image.

In operation 1002, the spatially aware media engine 902 performs functions for detecting, recognizing, and/or otherwise identifying attributes (e.g., 3D spatial features, objects) of the real-world sub-space region depicted in the source image data (e.g., camera feed). These 3D spatial features may include the surfaces, edges, corners, and/or light sources of the real-world sub-space region, for example. Once identified, the spatially aware media engine 902 references the attributes and other 3D spatial features to develop and generate a representation, map, layout, overlay, and/or virtual environment of the real-world sub-space in 3D. The spatially aware media engine 902 may define the 3D spatial features within a coordinate system that the spatially aware media engine 902 then maps to the real-world sub-space based upon the analysis of the source image data. The spatially aware media engine 920 may analyze various attributes and measurements to identify the 3D spatial features of the real-world sub-space region. For example, the shape, dimensions, orientation, location, texture, and/or reflectivity of the 3D spatial features may be determined based on analysis of the measurements.

In some implementations, the measurements obtained and analyzed in operation 1002 may include or otherwise provide one or more 3D scans of a real-world sub-space region. Obtaining a 3D scan may include moving or rotating a sensor with a real-world sub-space region to capture multiple angles of the real-world sub-space region. LIDAR, radar, and photogrammetry (creating a virtual object from a series of 2D) are example methods for generating a 3D scan of a real-world sub-space region.

In some embodiments, the computing device may perform various object recognition operations that identify particular real-world objects in the source image data, allowing the computing device to perform one or more downstream operations based on the real-world objects identified.

Operation 1004 includes the spatially aware media engine 902 executing one or more functions for mapping, anchoring, pinning, or otherwise associating the attributes and 3D spatial features (in operation 1002) with respect to the source image. For instance, the spatially aware media engine 902 may map the spatial features (e.g., dimensions, walls, colors, surfaces) and the real-world objects to a coordinate system for the real-world living room. As a result, the spatially aware media engine 902 may generate various types of spatially aware media data for the living room that is enriched with spatial features. The spatially aware media element may be used for presenting virtual objects in an augmented image display of the camera feed (e.g., AR display of the living room) and/or generating and presenting a virtual environment for the source image data (e.g., VR display of the living room) containing the virtual objects. For instance, because the depth, surfaces, curves, and other attributes of a real-world coffee table are mapped to the coordinate system generated for the image data of the living room, the computing device may display a virtual picture frame on the coffee table in a way that contextually matches and is realistically situated to the surface(s), curve(s), and other attributes of the coffee table and the living room. In some implementations, any, one, some, or all of operations 1002 and 1004 is/are performed at least in part using a simultaneous localization and mapping (SLAM) process.

FIG. 5 illustrates an example of 3D spatial features (e.g., surfaces 500-514) mapped to an image 400.

In some implementations, the operation 1004 includes the spatially aware media engine 902 executing one or more functions for determining or otherwise obtaining a camera position at which the image media was captured in the real-world region. Consider, for example, a case in which the computing device obtains the source image of the real-world region (e.g., a frame from a view of the camera feed of the customer device 930). The computing device may identify the camera position (including the location, perspective angle, and orientation) of the camera capturing the image within the real-world sub-space region. This position may include a coordinate within a coordinate system that is mapped to the real-world sub-space region, for example. The spatially aware media engine 902 may use the position of the camera, as well as the parameters of the camera, to determine the image's field of view in the real-world sub-space region. These parameters of the camera may include focal length, angle of view, and magnification, for example. The spatially aware media engine 902 may map the 3D spatial features of the real-world sub-space region identified in operation 1002 to the image data based, at least in part, on the field of view of the image. Optionally, this mapping may be performed without the need for image analysis to be performed on the image. In this way, determining the position and parameters of the camera that captured the image of the real-world sub-space region may provide the spatially aware media engine 902 relative values for mapping the image to the attributes, objects, and other 3D spatial features of the real-world sub-space region.

In some implementations, the various types of data and 3D spatial information included in the spatially aware media may be stored together in a data record, such as a spatially aware media record 912, in a database (e.g., platform database 308) or other non-transitory storage media (e.g., server memory 906, customer device memory 932, 954). For example, if the spatially aware media data includes an augmented image of a real-world sub-space region, then the media record 912 may store the source image data (e.g., one or more source images), the attributes and 3D spatial features captured in that source image, the augmented image, any virtual objects overlaid to augment the source image, and/or the mappings and coordinate system(s) generated using the source image. For instance, at least some of the pixels in the augmented image could be an assigned XYZ coordinate. As another example, if the spatially aware media data includes a virtual environment generated from the source image of a real-world sub-space region, then the media record 912 may store the source image, the sub-space region data including the attributes and 3D spatial features of the real-world sub-space captured in that source image, the virtual object data including the attributes and 3D spatial features of the real-world objects, and/or the mappings and coordinate system(s) generated for the sub-space region.

In some implementations, the various types of data and the 3D spatial information included in spatially aware media may be stored separately. For example, the media record 912 may store a continuous augmented image (AR image data) or a virtual environment (VR image data) of a real-world sub-space region separately from the source image data (e.g., one or more source images of the real-world sub-space region in the database). The mapping(s) between the AR/VR image data and the source image data may also be stored in the media record 912, allowing the 3D spatial features captured from the source image data to be identified based on the mapping. For example, the mapping may include a position (including a location and an orientation) of the camera that captured the image relative to the 3D spatial features and the field of view of the camera.

A virtual object record 914 may be a data record containing virtual object data stored in the database or other non-transitory storage medium. The virtual object data includes, for example, the visual rendering, attribute information, and other 3D spatial information for various types of objects (e.g., objects, products, buildings, locations, scenery, people, anatomical features, animals). In some configurations, a virtual object includes a mathematical representation of an object that is defined with various attributes (e.g., length, width, height). The virtual object may be positioned or otherwise defined within a 3D coordinate system, which could be a Cartesian coordinate system, a cylindrical coordinate system, or a polar coordinate system, for example. A virtual object may be entirely computer-generated or may be generated based on measurements of a real-world entity. Possible methods for generating the virtual objects from a real-world object may include photogrammetry, 3D scanning, computer vision, and/or object recognition.

As illustrated in FIGS. 6-8, for example, a virtual object (e.g., picture frame 602) may be implemented in the AR/VR imaging generated using the spatially aware media. This may allow a virtual object to be viewed at various angles within the AR/VR representation of a real-world sub-space region. In some implementations, one or more virtual objects stored in the virtual object record 914 provide virtual representations of products sold online by merchants. spatially aware media engine 902 may generate or modify the spatially aware media using the virtual objects to present the products to the customer device 930. The virtual object in the virtual object record 914 may be obtained in several different ways. In some implementations, at least some of the virtual objects are obtained from a user of the spatially aware media engine 902, such as from a customer or a merchant.

A merchant could generate one or more virtual objects for any, one, some, or all of the products sold in the merchant's online store. These virtual objects may be provided directly to the spatially aware media engine 902 from the merchant; the computing device executing the spatially aware media engine 902 (e.g., server 901, customer device 930) may obtain the virtual objects from the merchant profile data record in the e-commerce platform database; and/or the computing device may obtain the virtual objects from the merchant's online store. The virtual objects may also be obtained from other data sources, such as social media servers, for example. In addition, some virtual objects may be generated locally at the particular computing device executing the spatially aware media engine 902. For example, images or scans that are obtained by the spatially aware media engine 902 can be used to generate a virtual object.

The AR/VR media generator 916 includes, employs, and/or implements one or more algorithms (possibly in the form of software instructions executable by the processor 904, 932, 952) capable of generating instances of spatially aware AR/VR media data. FIGS. 6-8 provide examples of instances of spatially aware AR/VR media data.

To generate an instance of spatially aware AR/VR media data, possible inputs to the AR/VR media generator 916 include, for example, spatially aware media, optionally obtained from the spatially aware media record 912; one or more virtual objects, optionally obtained from the virtual object record 914; and a position or "anchoring point" for a virtual object relative to the 3D spatial features indicated by the spatially aware media. The virtual position may be obtained from a user input at one or more customer devices 930, for example. Alternatively, as discussed herein, the position may be automatically determined by the spatially aware media engine 902.

Instances of spatially aware AR/VR media data that are output by the AR/VR media generator 916 may include, for example, visual, haptic, and/or audio content that is added to the spatially aware media data. This visual, haptic, and/or audio content may be obtained from, or otherwise based on, a virtual object that is defined relative to the 3D spatial features of the corresponding real-world sub-space region. In this way, when added to the spatially aware media, the visual, haptic, and/or audio content may match the 3D spatial features of the real-world sub-space region.

Visual content may allow a customer to view a virtual object within an image provided by the spatially aware media. This visual content may be generated and/or overlaid with an image based on a virtual position of the object relative to a viewpoint of the image in the corresponding real-world sub-space region.

Instances of spatially aware AR/VR media data can be continuously or intermittently updated by the AR/VR media generator 916 in response to user input. For example, if a virtual object is moved to a new virtual position relative to the 3D spatial features of spatially aware media, then a new instance of spatially aware AR/VR media data including updated virtual content can be generated to reflect the new position of the virtual object.

In some embodiments, the server 901 may execute the spatially aware media engine 902a to generate one or more virtual environments representing corresponding sub-space regions (e.g., bedroom, living room, kitchen) defining a customer's physical space (e.g., house). Using the identified spatial features of the real world sub-space, the spatially aware media engine 902a may generate the virtual environment of the real-world sub-space region. The spatially aware media engine 902a may represent one or more virtual products situated within the virtual environment. For instance, the customer may scan a bedroom and the analytics server may identify and aggregate the spatial features of the bedroom.

Figure 11:
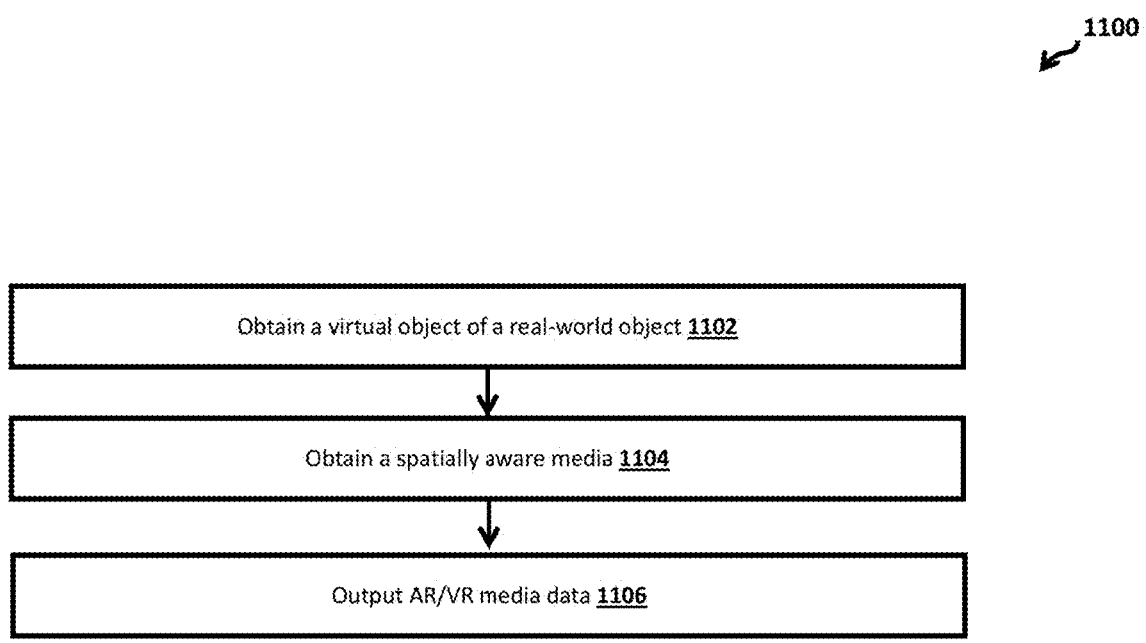
FIG. 11 illustrates a flow diagram illustrating a method for providing AR/VR media data, according to an embodiment.

FIG. 11 illustrates a flow diagram illustrating a method 1100 for providing AR/VR media data, which will be described as being performed by the spatially aware media engine 902 executed by a computing device (e.g., customer device 930, server 901). For example, the spatially aware media engine 902 may include instructions that, when executed by a processor 904, 932 of the computing device, causes the processors 904, 932 to perform the method 1100. Some or all portions of the method 1100 may be performed on various computing devices, such as a server 901 and a customer device 930, having the software and hardware components for performing the various functions described here.

In operation 1102, the computing device obtains a virtual object representing an object, such as a product offered by a merchant. The computing device may query one or more databases or other non-transitory storage media for the virtual object of the product based on, for example, various attributes of the object (e.g., name, identifier, spatial attributes), the sub-space region (e.g., surfaces detected, objects recognized, spatial attributes, type of region), or the customer (e.g., user preferences, user inputted instructions, customer profile), among various other types of data or inputs that may form the parameters of the query. The virtual objects may be obtained from the virtual object record 914, or from elsewhere (e.g., third party data repositories).

In some implementations, virtual objects may be directly provided to or otherwise obtained by the spatially aware media engine 902, independent of a search query. For instance, the customer enters user inputs indicating a selected product to be visualized using methods and systems discussed herein, and the computing device may generate or retrieve a corresponding virtual object for that particular product.

As an example, the customer device 930 may capture an image of a real-world object that the customer would like to preview in a particular sub-space region (e.g., living room). The customer may enter touch-based or spoken instructions, which are received by the user interface 936, instructing the customer device 930 to generate an AR or VR display containing a virtual preview object of the real-world object. For instance, the customer may submit a verbal instruction to preview the virtual object within the desired sub-space region (e.g., "show me this picture frame in my living room"). The customer device 930 may recognize the real-world object by executing an objection recognition function, or may query one or more databases or the Internet, such that customer device 930 may identify the real-world object, and retrieve or generate a virtual preview object representing the real-world object. For AR operations, the verbal instruction instructs the customer device 930 to generate and display source image data (e.g., camera feed) augmented with an overlay including a rendering of the virtual preview object. For VR operations, the verbal instruction instructs the customer device 930 to retrieve a virtual environment representing the particular sub-space region (e.g., living room), and then generate and display the virtual environment including the rendering of the virtual preview object.

Operation 1104 includes obtaining spatially aware media from a database or from another computer-readable medium. For example, the spatially aware media may be obtained from the spatially aware media record 912 in a database or stored in a device memory 906, 934, 954. In another example, the spatially aware media may be the camera feed received from the customer device.

The spatially aware media may include an image of a real-world sub-space region and information identifying 3D spatial features of the real-world sub-space region. In some configurations, the camera feed received from the customer device may be analyzed to obtain the spatially aware media in real-time (or near real-time). For example, the customer may wish to view the virtual objects obtained in operation 1102 in a particular real-world sub-space region and may select the spatially aware media accordingly. This real-world sub-space region may be a real-world sub-space region that is associated with the customer's physical space, such as a room of the customer's house.

Operation 1106 includes outputting AR/VR media data that is based on the spatially aware media obtained in operation 1104 and the virtual object obtained in operation 1102. For example, the AR/VR media data may be based on at least some of the virtual objects that are included in the results of the search query.

In some embodiments, the virtual objects may be defined relative to the 3D spatial features of the real-world sub-space region using customer-defined and/or automatically generated positions for the virtual object. Therefore, in each instance of AR/VR media data, a render of a respective virtual object may be situated within the AR/VR display to realistically depict the virtual object within the real-world sub-space region.

Methods and Systems for AR/VR Operations and Voice Commands

Figure 12:
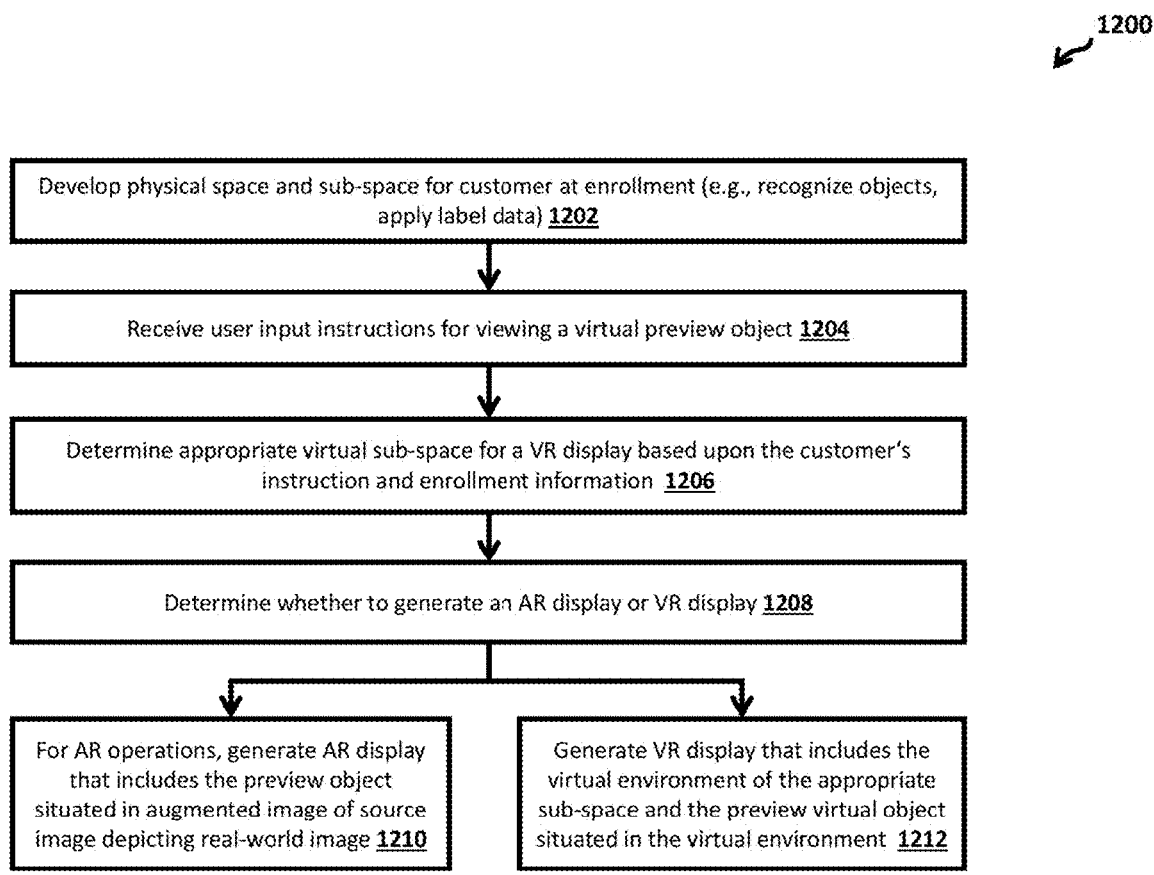
FIG. 12 illustrates a flowchart depicting operations of a method for generating and applying various types of data for AR/VR presentations according to customer instructions, according to an embodiment.

FIG. 12 illustrates a flowchart depicting operational operations of a method 1200 for generating and applying various types of data for AR/VR presentations according to customer instructions. For ease of understanding, a server of a cloud-based platform service (e.g., analytics server 318 of e-commerce platform 306 in FIG. 3) performs certain functions and operations of the method 1200, and a customer device (e.g., customer device 302 of FIG. 3) performs certain functions and operations of the method 1200. In this way, the description of the method 1200 generally relates to a familiar user experience to aid in understanding of FIG. 12. However, nothing in FIG. 12 should be viewed as limiting on the potential distribution of functions, operations, tasks, or other features among computing devices in other embodiments.

In operation 1202, the server may obtain various types of data for a customer's physical space data and sub-space regions for a customer profile at registration or when updating the enrolled customer profile data. To obtain the various types of data, the server may, for example, receive data as inputs from the customer device (e.g., data generated by the customer device, data inputted as user inputs), generate data by executing various software operations for analyzing image media data (e.g., received from the customer device, received from third-party devices), and/or querying a database or third-party devices to retrieve certain types of data. Non-limiting examples of the various types of data obtained by the server may include customer profile data, the physical space data, the sub-space region data, and object data, among others.

The server may generate (or updated) virtualized environments representing the physical space (e.g., house, apartment, office building) and/or sub-space regions (e.g., rooms of the house or apartment, individual offices) based on source image data obtained by the server (e.g., uploaded to the server from the customer device, retrieved from database). In some implementations, the server may perform various source image data ingestion or scanning functions (sometimes described or referred to as functions of a spatially aware media engine 902 or spatially aware media generator 910) that generate virtual environments and/or objects, among other types of data that the scanning functions may identify in the source image data. The scanning functions may analyze the source image media data containing depictions of the real-world sub-space region, identify attributes and features of the real-world region from the source image data, and generate the various types of data. The scanning functions may analyze the source image media of any number of regions of the physical space for generating the virtual environments for the regions of the physical space by analyzing source image data of the region captured by, and received from, the customer device.

In some implementations, the scanning functions may include executing, for example, computer vision and/or object recognition functions using the source images. The scanning functions capture images of the region and generates (or maps) a coordinate plane of the region according to physical attributes, spatial features, and/or objects identified in the source images. The scanning function uses the coordinate plane to build the virtual environment and situate visual renderings of virtual objects that the server identified in source image data according to mappings between the virtual objects to the coordinate plane.

In generating data for the physical space and/or the sub-space regions, the server may perform a sectioning function that generates and organizes the various types of data associated with the customer and/or the customers' physical space. The sectioning function may associate each of the sub-space regions (of the customer's physical space)

with one or more sub-space region identifiers, such as tags, labels, and voice recognition identifier ("verbal identifier"), as instructed by the customer's configuration inputs received during registration operations or when updating the registered customer profile data.

In some embodiments, the sectioning functions may logically partition the customer's physical space (e.g., house) into one or more sub-space regions (e.g., rooms). The user may manually input the region identifiers for a particular room. Additionally or alternatively, the server executes layers of a machine-learning architecture of a region prediction engine that recognize and predict the type of region (e.g., living room, kitchen, bathroom) based on commonly recognized features (e.g., couch, oven, bathtub) for that type of region, and/or recognize natural physical partitions or barriers (e.g., doorway, half-wall, service window) as attributes or 3D spatial information of the region that the server may reference to determine, for example, the dimensions of the region and determine the logical partition between adjacent distinct regions. The server may then automatically associate the region identifiers with the particular regions as predicted by the machine-learning architecture.

In a configuration, the customer device executes a software application associated with the cloud-based or platform service hosted by the server ("client app"). The client app may generate and display a prediction confirmation interface that prompts the customer to confirm whether the region prediction engine of the machine-learning architecture predicted a region's identifier accurately.

In some implementations, the server may generate and store an object table associated with the virtual environment data or region data in a database. The object table indicates or lists the objects in the region. The table may further include various types of object data that the server or client app references to generate the AR/VR displays. In a configuration, the server may generate a tag or label for the particular region (e.g., "living room" label, "kitchen" label), which the server associates with (and may use to identify) the particular region data. The customer may provide the region identifiers to the server via the customer device, or the server may execute various functions to output or predict the region identifier (for the type of region) based upon the objects that the server identified in the region.

In some embodiments, the customer device may execute the client app, and the client app may include the same or similar ingestion or scanning functions as those performed by the server (in operation 1202).

In operation 1204, the customer device may receive a user input containing instructions for viewing a virtual preview object of a real-world object. The viewing instructions may indicate, for example, the type of real-world object and a sub-space region of the customer's profile data (e.g., "Show me this picture frame on the coffee table in the living room").

The customer may operate the client app executed by the customer device to generate and interact with a graphical user interface displaying VR or AR presentations of the region using various types of interface instructions (e.g., touch-based inputs, voice-based inputs). For example, the customer may say a name or type of a region (room), a region identifier, or a name or type of the object, which the client app interprets to retrieve the various types of data of the region indicated by the customer's spoken instructions, such as the virtual representations of the region and objects situated in the region.

In some cases, a microphone of the customer device may receive the spoken instruction as an utterance as part of an analog audio signal and convert the analog audio signal into an electrical digital signal, which the customer device may interpret as machine-readable data and executable instructions. The client app may execute a natural-language processing (NLP) machine-learning function that receives the utterance in the digital signal and recognizes the customer's voice commands. In some implementations, the NLP function may perform, for example, speaker diarization operations that receives the utterance and generates a transcription of the utterance, and the NLP function then ingests the transcription and interprets the instructions into machine-executed instructions for the client app or the server.

The client app or server may recognize a new object from a source image and generate a new virtual object representation of the new object. For example, the customer may capture a source image of a new real-world object when browsing a brick-and-mortar store. The client app or server may recognize the new real-world object by executing an objection recognition function or querying one or more databases and/or the Internet. The client app or server may generate and store a virtual render for a preview object representing the new object. The system then situates the new virtual object in the virtual representation (AR or VR display) of a particular region according to the customer's instructions indicating the particular region.

The customer may submit a verbal instruction to preview the virtual object within the desired region (e.g., "show me this couch in my living room"), which instructs the system to display the virtual environment containing the new virtual object. The user may navigate, rotate, reorganize, or otherwise alter the virtual representation of the region containing the new virtual object through various types of inputs to the client app.

In some embodiments, when the customer submits a touch-based or spoken instruction through the client app (e.g., "display this table in my living room"), the client app or server references the identifiers (e.g., voice identifier) to retrieve and display the appropriate region.

Optionally, in operation 1206, the customer device may determine an appropriate virtual sub-space requested or suggested by the customer's instructions, based upon the customer's instruction and enrollment information. In some cases, the customer's instructions explicitly indicate the sub-space region (e.g., "Show me this picture frame on the coffee table in the living room"). In some cases, however, the customer's instructions are not explicit about the region and/or object, lacks certain details, or otherwise contain ambiguity (e.g. "show me this picture frame in the living room," "show me this picture frame on the coffee table," "show me this picture frame in front of the TV"). The client app may perform various operations to predict or infer the customer's intended instructions.

In some embodiments, the client or server may automatically select which region to present to the customer device based upon the type of new object (e.g., preview object). The client app or server may execute the various object recognition functions to recognize the new object. In some cases, the client app or server may further query a table that indicates a classification or type of object as an attribute of the recognized object, or may execute an object classification engine of the machine-learning architecture that determines the classification or type of object as an attribute of the recognized object. For example, the camera of the customer device may capture an image of a bathmat and the client app may apply an object recognition function on the image of the bathmat to identify/classify the type of object in the image is a bathmat or identify the brand of the bathmat. The customer device may select and present the customer's bathroom region from a list or table of the customer's sub-space regions due to recognizing a bathmat object.

Additionally or alternatively, the client app or the server may execute the functions of the region prediction engine to predict the particular sub-space region data associated with the type of object (or other attributes of the object), and retrieve for generating the AR/VR presentation. The client app then displays the virtual environment having the new virtual object in the appropriate sub-space region. In this way, by determining the objects or types of objects typically associated with the regions or types of regions, the region prediction engine may predict an appropriate region or type of region having attributes (e.g., types of objects, objects, spatial features) relevant to or routinely associated with the objects or types of objects and/or may infer the customer's desired region in which to preview the new object from ambiguous instructions.

In operation 1208, the customer device may determine whether to generate an AR display or VR display. The customer device may determine whether to generate an AR display or VR display according to the same or additional instructions received through the same or additional user inputs. Additionally or alternatively, the customer device may automatically determine whether to generate an AR display or VR display based upon, for example, a current location of the customer device. For instance, if the customer device is currently located in the customer's living room, then the customer device may determine to employ the AR display, since the customer has the benefit of previewing the preview object situated in the real-world depiction of camera feed of the living room. Although this description mentions "previewing" an object and "preview object," embodiments are not so limited in potential uses. The embodiments may be used in many circumstances in which the customer wants to view the object in various contexts and various virtualized or augmented environments. Likewise, if the customer device is currently located at a brick-and-mortar store, then the customer device may determine to employ the VR display, providing the customer the benefit of previewing the preview object situated in the virtual environment representing the customer's living room even though the customer actually in the brick-and-mortar store.

In some circumstances, the client app may generate and present the new object within an image of a room via an augmented representation of a camera feed when the client app or server determines that the end-user is located in the room, such as using geo-location data or by executing the machine-learning operations for identifying the particular region based upon the objects recognized in the source image data (e.g., camera feed) captured for the region. For example, when the customer invokes the client app to generate a virtual environment via an input to the user interface or by spoken utterance with instructions indicating the sub-space region, the client app determines that the current GPS coordinates of the customer device correspond to the stored GPS coordinates for the customer's space or sub-pace (e.g., house, living room).

In optional operation 1210, when the customer device determines to execute the AR operations (in operation 1208), the customer device generates an AR presentation that includes the preview virtual object representing a new real-world object situated in an augmented image of a source image (e.g., camera feed) depicting a real-world region in the camera feed.

The client app may generate various types of data for generating the AR virtual environment, which may include the augmented image data that the client app enriched with the coordinate system and other spatially aware media data. When generating the preview virtual object within the AR virtual environment, the client app may situate the virtual object according to user inputs, automated algorithms, or preconfigured defaults. The client app may retrieve or generate a rendering for the preview virtual object representing the new real-world object, and situate the preview virtual object as an overlay in the augmented image data based on a position. The position includes any number of positioning parameters employed by, and mapped to, the coordinate system(s) of the augmented image.

In some cases, the client app may determine the position and/or positioning parameters indicating where and how to situate the preview virtual object according to customer inputs (e.g., touch-based inputs via touchscreen, uttering verbal commands).

In some implementations, the client app may be preconfigured to situate the preview virtual object according to various preconfigured defaults or algorithms. In some cases, the client app may be preconfigured with positioning data that situates the preview virtual object, for example, in the customer's real-world line-of-sight, directly in front of the customer, or in the center of the graphical user interface presenting the camera feed. In some cases, the client app may be preconfigured to dynamically determine positioning data to situate the new virtual object in a contextually realistic and appropriate location (e.g., place a vase virtual object on a table, not on a sofa; avoid collisions or overlaps) based upon, for example, attributes of the objects and/or the region (e.g., surfaces detected in the region, types of objects, position and spatial information of the other objects). In this way, the client app may identify and avoid "collisions" of overlapping virtual objects.

Additionally or alternatively, the customer may enter a touch-based input to "hold" and "drop" the virtual object within a particular position or location. As mentioned, the client app may maintain contextual awareness of the attributes and positions of the other objects in the region according to the three-dimensional coordinate system, allowing the client app to situate the new virtual object relative to the other real-world objects in real-world depiction of the region in the camera feed.

In optional operation 1212, when the customer device determines to execute the VR operations (in operation 1208), the customer device generates a VR presentation that includes the preview virtual object representing the new real-world object situated in a VR virtual environment representing the sub-space region indicated in the instruction.

The client app may retrieve the customer's requested or predicted region from the server or database. When generating the preview virtual object within the virtual region, the client app may situate the virtual object according to user inputs, automated algorithms, or preconfigured defaults. The client app may retrieve or generate a rendering for the preview virtual object representing the new real-world object, and situate the preview virtual object based on a position. The position includes any number of positioning parameters employed by, and mapped to, the coordinate system(s) of the virtual environment.

In some implementations, the client app may determine the position and/or positioning parameters indicating where and how to situate the preview virtual object according to customer inputs (e.g., touch-based inputs via touchscreen, uttering verbal commands).

In some implementations, the client app may be preconfigured to situate the preview virtual object according to various preconfigured defaults or algorithms. In some cases, the client app may be preconfigured with positioning data that situates the preview virtual object, for example, in the center of the graphical user interface presenting VR presentation. In some cases, the client app may be preconfigured to dynamically determine positioning data to situate the new virtual object in a contextually realistic and appropriate location (e.g., place a vase virtual object on a table virtual object, not on a sofa virtual; avoid collisions or overlaps) based upon, for example, attributes of the various virtual objects and/or the VR virtual environment (e.g., surfaces detected in the region, types of objects, position and spatial information of the other objects). In this way, the client app may identify and avoid "collisions" of overlapping virtual objects.

Additionally or alternatively, the customer may enter a touch-based input to "hold" and "drop" the virtual object within a particular position or location. As mentioned, the client app may maintain contextual awareness of the attributes and positions of the other objects in the VR representation of the region according to the three-dimensional coordinate system, allowing the client app to situate the new virtual object relative to the other virtual objects in the VR virtual environment representing the region.

Figure 13:
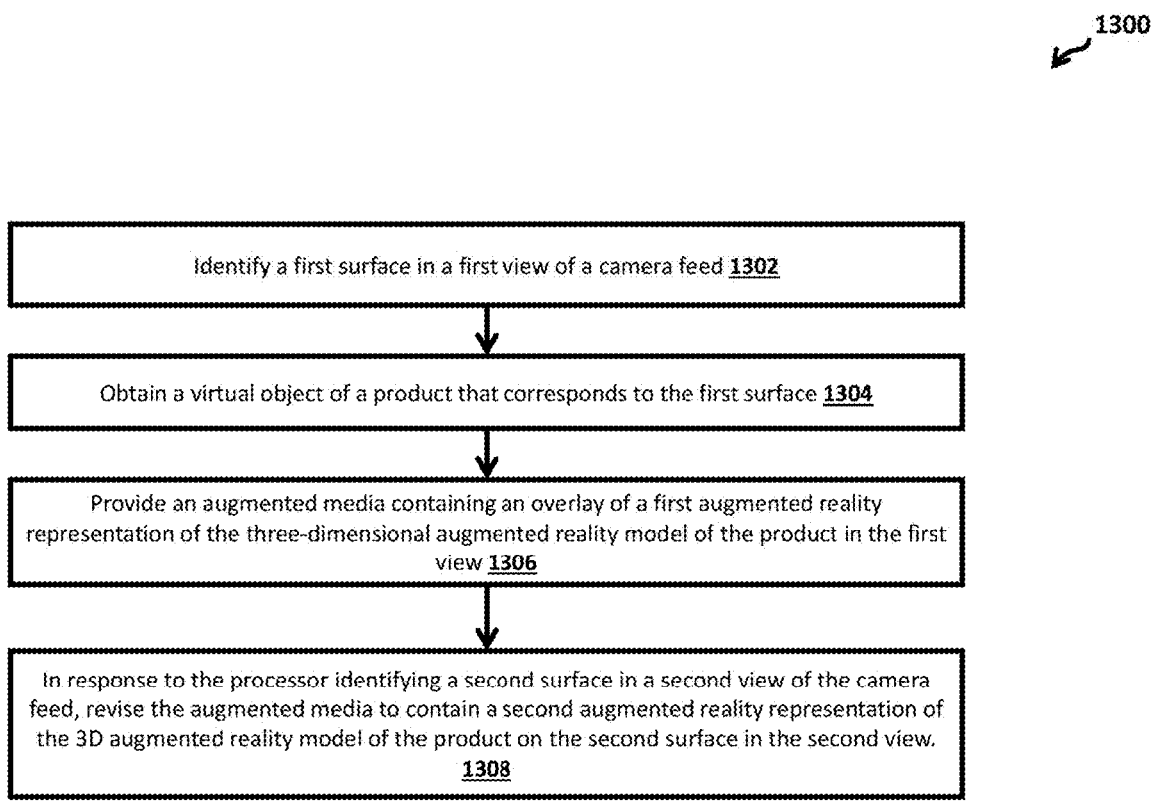
FIG. 13 illustrates a flowchart depicting operations for a dynamic object presentation in a virtual environment according to AR operations, according to an embodiment.

FIG. 13 illustrates a flowchart depicting operational operations of a method 1300 for a dynamic object presentation in a virtual environment according to AR operations. The method 1300 describes how a server, such as the analytics server described in FIG. 3, can dynamically generate or modify the AR presentation of a graphical user interface presenting virtual objects (e.g., ¶sometimes referred to as "media elements") depicting an object. The method 1300 is described as being executed by the client app software, which may be executed by the customer device. The various features and function described in method 1300 may be executed by one or more computing devices (e.g., server, customer device).

At operation 1302, the client app may identify a first surface in a first view of a camera feed from a customer device. The client app may identify a surface in a first view of a camera feed from a customer device. The client app may analyze media elements received from a camera of an electronic device (e.g., customer devices described in FIG. 3 or FIG. 9) using various methods discussed herein. For instance, the client app may analyze a camera feed (e.g., images or video feed captured by a camera of a customer device) using the methods and systems discussed in FIGS. 4-11. Using the methods and systems described herein, the analytics server may obtain one or more surfaces presented within the customer device's camera feed.

In a non-limiting example, as a customer repositions the customer device (e.g., smartphone) around a region, the client app or analytics server executes a SLAM algorithm to determine a relative position of the customer device (e.g., location of the customer device to the world around it). The client app may also detect visually distinct features in the customer device's camera feed and may track these feature points across subsequent video frames to compute the change in the customer device's location. The client app may then combine this visual information with data from the customer device's internal measurement unit (IMU) to estimate the real-time position and orientation of the customer device's camera relative to the 3D coordinate space of the world around the customer device (e.g., room in which the customer and their customer device are located).

The client app may also utilize plane detection algorithms on the camera feed in combination with processing IMU data to distinguish between different surfaces. For example, floors may be distinguished from walls when the plane detection algorithm returns a horizontally oriented plane while, at the same time, IMU data indicates the device is pointed downwards. Similarly, ceilings may be distinguished from floors when the system detects a horizontal plane while IMU data indicates an upward-facing orientation.

Existing AR applications may be configured to detect horizontally oriented surfaces but are typically unable to determine the context of a particular surface (e.g., unable to distinguish between a tabletop, a floor, or a ceiling). To rectify this problem, the client app may distinguish between surfaces (e.g., floors and other horizontally oriented surfaces like tables) by using depth mapping technology and methods such as ray-casting. For instance, the client app may determine that the horizontal plane of the table is higher than that of the floor. In compatible devices, LIDAR scanners or other sensors may be used to provide more accurate depth information.

At operation 1304, the client app may obtain a virtual object of a product that corresponds to the first surface, wherein the correspondence of the product to the surface is based at least in part on a type of the first surface. The client app may identify a product that corresponds to the identified surface. After identifying one or more surfaces within the camera feed, the client app may use customer preferences (retrieved from a customer profile stored in a database) to recommend one or more products for the customer based upon one or more attributes identified for the region. The recommended products may also be suitable in accordance with one or more attributes of the identified surface (e.g., a type of the identified surface). For instance, if the client app identifies a horizontal surface, the client app further analyzes the surface to determine whether the horizontal surface belongs to a couch, table, or chair. The client app may then query a database to identify one or more products that correspond to the identified customer preferences and/or attributes of the recognized object associated with the identified surface.

In a non-limiting example, when the client app identifies that the horizontal surface belongs to a table (not a couch), the client app queries for products that could be placed on the table. The client app may then use a dimensionality attribute to filter the retrieved products (e.g., eliminate products that would not fit on the table). The client app may then use various rules to filter the remaining products by what is suitable for the identified table. For instance, the client app may determine that a television is not suitable to be placed on a dining table. In contrast, the client app may determine that a vase or a picture frame is a suitable product to be placed on the dining table. The client app may then filter the remaining items by the customer's preferences. For instance, the client app may determine that the customer is interested in vases and not picture frames.

At operation 1306, the client app may provide an augmented media containing an overlay of a first AR representation of the virtual object of the product in the first view. The client app may generate an AR layer containing a first AR representation of the product on the surface in the first view.

After identifying one or more products, the client app may display an augmented media element (also referred to as an AR layer) that contains a representation of a virtual object of the product fit within the camera feed, as presented on the customer's device. As discussed herein, the augmented media may be a representation of the camera feed (e.g., real-world images) that has been combined with a rendering or a representation of the obtained virtual object, such as described and depicted in FIGS. 4-11.

In an embodiment, the client app may first retrieve a virtual object that corresponds to the product identified in operation 1304. Virtual objects (e.g., virtual models that depict a particular product and include various attributes of the product, such as product details and dimensionality) may be pre-configured and stored within a data repository (e.g., product catalog) accessible to the analytics server. For instance, the virtual objects may be generated by developers in the design phase before being stored in the data repository to ensure that they maintain their real-life use and orientation. Upon identifying the products, the client app may retrieve corresponding virtual objects associated with the identified products.

Using the methods and systems discussed herein, the client app may display a representation (e.g., rendering) of the retrieved virtual object as an additional layer to the camera feed that is displayed on the customer device.

In some configurations, the client app may provide the option for the customer to dynamically change the product depicted as the AR layer. For instance, the client app may display an AR-supported product catalog. As used herein, the AR-supported product catalog may refer to a list of products that can be displayed as an additional AR layer to the camera feed. The catalog may include different possible products to be selected by the customer. The customer may browse through product catalogs from any number of online retailers that have enabled support for virtual object(s) of product(s). The products in the catalog may be sorted into any number of different product categories, e.g., the product catalog may contain models for tables, tablecloths, chairs, rugs, wall paintings, ceiling fixtures, etc. Alternatively, instead of browsing, a customer may choose to accept suggestions from a product recommendation engine, whereby a product recommendation engine uses the CID to recommend a product to the customer (e.g., factors such as a customer's purchasing history, browsing history, customer-specified keywords, specified product categories, trending products or other customer preferences and settings such as wish-lists, color preferences, furniture dimensions).

Additionally or alternatively, the product recommendation engine may dynamically recommend suitable products based on real or AR objects present in the space. For instance, the client app may determine one or more existing items/objects on a dining table. Specifically, the client app may determine that the dining table already includes a vase. As a result, the client app may not recommend an additional vase to be placed on the dining table. Instead, the client app may recommend a picture frame to be placed on the table. When the client app identifies multiple surfaces suitable for multiple different products, the client app may confirm the desired surface with the customer.

At operation 1308, the client app may responsive to the processor identifying a second surface in a second view of the camera feed from the customer device, revise the augmented media to contain a second AR representation of the virtual object of the product on the second surface in the second view.

The client app may continuously monitor the camera feed received via the customer device. When the client app determines a new surface associated with the camera feed, the client app may display a second AR representation of the product. The second AR representation of the product may include a virtual depiction of the first product displayed and operation 1306. However, the second AR representation may include a different configuration or size associated with the product. In a non-limiting example, the second AR representation may include a different arrangement or size of the same product virtually depicted in operation 1306. In this way, the client app ensures that the AR representation of the recommended products is dynamically updated, such that they are always suitable for the surface within the customer's camera feed.

In an example, a customer is browsing through the product catalog of an online store that sells home decor. The customer then clicks on the product page for a set of picture frames. The customer then indicates a desire to view an AR representation of picture frames, for example, by saving the picture frames using the application (merchant application or an application provided by the analytics server). The customer can save multiple virtual products using the above-described method. Alternatively, the customer can request a product recommendation. When the customer requests the application to recommend a product, the client app identifies a product to be displayed based on the customer's profile and the surfaces surrounding the customer. As a result, the client app identifies one or more suitable products for the customer (based on the customer's preferences and the identified surfaces).

After selecting a product to be viewed or requesting the client app to recommend a product, the customer clicks on "AR View" (displayed on the application). As a result, the application (via receiving instructions from the analytics server) activates a camera of the customer device and displays the camera feed.

Figure 14:
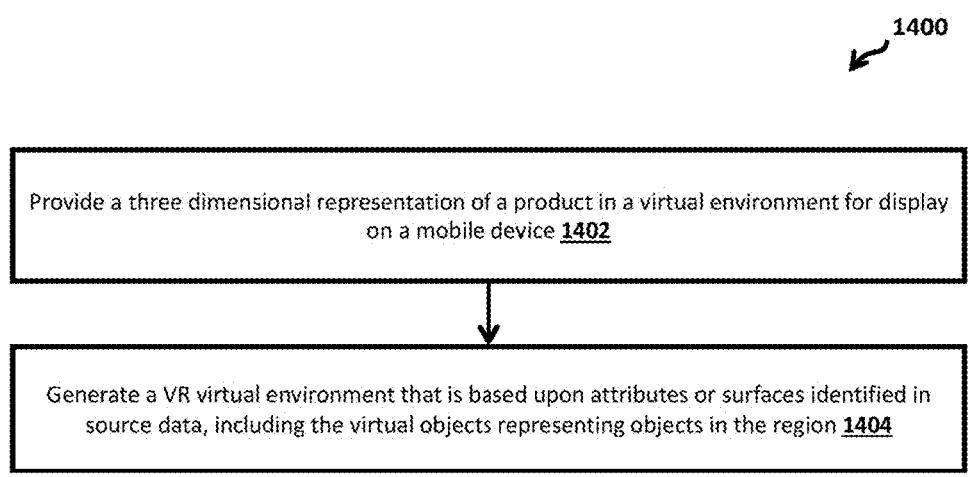
FIG. 14 illustrates a flowchart depicting operations for a dynamic product presentation system according to AR or VR operations, according to an embodiment.

FIG. 14 illustrates a flowchart depicting operational operations of a method 1400 for a dynamic product presentation system according to AR or VR operations. The method 1400 describes how a server, such as the analytics server described in FIG. 3, can dynamically revise a graphical user interface presenting a product based on a customer's surroundings. The method 1400 is described as being executed by the client app. The features and functions of the method 1400 may be executed by any number of computing devices (e.g., server, customer device).

At operation 1402, the client app may provide a 3D representation of a product in a virtual environment for display on a customer device. The client app may display a 3D representation of a product in a virtual environment for a customer via the graphical user interface. As described herein, the customer may enter instructions, via touch-based inputs or utters spoken instructions, selecting one or more products to view, and view them using the method 1400 discussed herein.

The VR virtual environment may include a VR representation of a sub-space region that is generated by the analytics server (or a third party) in which a rendering of a virtual object representing a product may be situated by the client app. For instance, the virtual environment may be generated by the server based on virtual objects or partitions of a source image of a region, including walls and other objects, such as table(s), chair(s), and the like. As described herein, the virtual environment may be a default environment (e.g., generic room) or customized per the customer's instructions. For instance, a customer can place a table (having certain attributes, such as size and color) within the customized virtual environment. The client app may then place a rendering of a new virtual object for a new product (e.g., vase) on the table within the customized virtual environment. In some configurations, the analytics server may customize the virtual environment using various images received from the customer (e.g., camera feed of the customer device). As a result, the virtual environment may resemble the customer's room or any other space defined by the customer. Therefore, as used herein, the virtual environment is different from augmented media that is used to provide AR presentation of a product (e.g., a combination of real-world images and an AR rendering of a product), though the virtual environment may be generated based on real-world images.

In some configurations, the media element may be an image of the product that is customizable based on one or more attributes received from the customer. For instance, the media element may be an image of a table where the attributes of the table (e.g., size, color, and style) and the table's surroundings (e.g., the virtual environment in which the table is depicted) can be customized by the customer. In a non-limiting example, the table can be placed in a room having attributes that can be customized by the customer.

In other configurations, the 3D representation of the product may be an animation (e.g., video file) depicting the product within a defined space (virtual environment). In some configurations, the 3D representation of the product may display the product within a virtual environment (e.g., defined structure) that is customizable based on customer inputs or other attributes. For instance, the 3D representation may depict the product within a virtual room that resembles a room defined by the customer, such as the customer's actual surroundings or a defined area/structure. The analytics server may construct a virtual environment that includes a 3D representation of a sub-space region (e.g., room) of a physical space (e.g., house). The customer may allow the customer device and analytics server to capture the camera feed associated with the customer's room and to generate the virtual environment using methods discussed herein.

In some configurations, the client app may monitor the customer's camera feed and gradually modify a VR environment that resembles the customer's room. The customer may then assign identifiers or attributes (e.g., location and name) to the virtual environment, such that the customer can later instruct the client app to depict the product within a particular virtual environment (e.g., virtual living room or virtual bedroom).

When depicting a product, the client app may retrieve a 3D representation of the product within a defined virtual environment (e.g., either selected by the customer or a default/generic virtual environment). The virtual environment may be pre-generated and/or customized by the customer. Alternatively, the virtual environment may be generated for displaying a particular product upon receiving a request from the customer. The virtual environment may include one or more surfaces that are suitable for the product. For instance, the customer may see a computer-generated wall. In another example, the virtual environment may include several 3D objects (e.g., the customer may be presented with a view of a living room containing virtual objects of a couch and a coffee table).

The virtual environment may have one or more attributes that resemble a defined space or have been customized by the customer. The customer may navigate around the 3D scene by using finger gestures on the touchscreen (e.g., pinching outwards to zoom in or pinching inwards to zoom out).

At operation 1404, the client app may generate a graphical user interface displaying the VR virtual environment of the region that is based upon attributes or surfaces identified in source data, including the virtual objects in the region.

Figure 15:
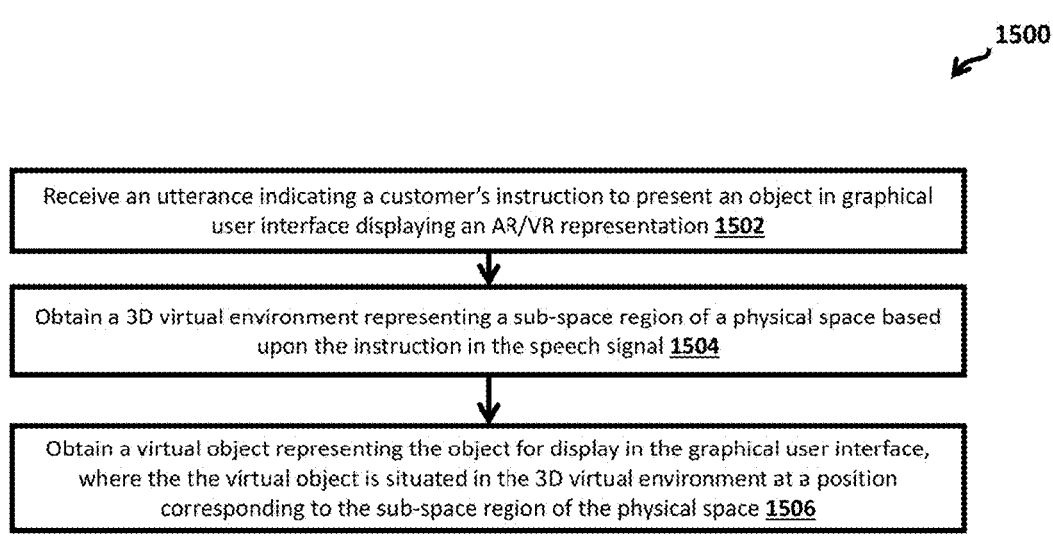
FIG. 15 is a flowchart illustrating an example method for executing the AR/VR operations according to utterances containing customer voice commands, according to an embodiment.

FIG. 15 is a flowchart illustrating an example method 1500 for executing the AR/VR operations according to utterances containing customer voice commands. The method 1500 may be performed by client app executed by customer device, though the features and functions of the method 1500 may be executed by any number of computing devices (e.g., customer device, server) comprising hardware and software components capable of executing the various functions described here. Some or all portions of the method 1500 may be performed on various computing devices, such as the server and the customer device.

In operation 1502, the client app may receive an utterance including a customer's instruction to present a virtual object in a graphical user interface displaying an AR/VR representation. In operation 1504, the client app may obtain (e.g., receive, select, or retrieve from the server or database) a 3D virtual environment representing a sub-space region of a physical space based upon the instruction in the utterance.

In operation 1506, the client app may obtain a virtual object representing the object for display in the graphical user interface in the 3D virtual environment. The client may situate the virtual object in the 3D virtual environment at a position corresponding to the sub-space region of the physical space, such that the graphical user interface displays the virtual environment for the sub-space region and one or more virtual objects situated in the virtual environment according to positioning parameters of each virtual object defining the position of the virtual object.

Example Mixed Reality Implementation

FIGS. 16A-16F are pictures of customer device 1600 executing a client app employing operations for AR, VR, and mixed-reality representations. A customer may browse a brick-and-mortar shop 1601 and decide to preview a plant 1603 in the customer's home.

Figure 16A:
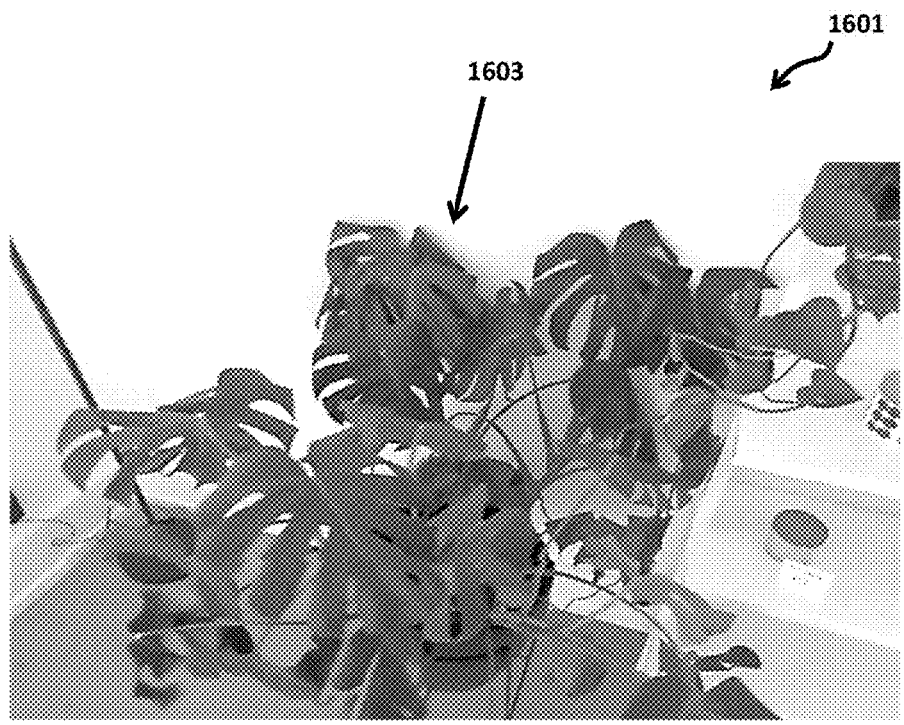
FIGS. 16A-16F are pictures of a customer device executing a client app employing operations for AR, VR, and mixed-reality representations, according to an embodiment.
Figure 16B:
Figure 16C:

As shown in FIG. 16B, the customer may operate the customer device 1600 to capture a camera feed capturing and displaying the image of the shop 1601, where the image of the shop 1601 captures the real-world plant 1603 at this time. The customer may enter a touch-based input or utterance indicating the customer's interest in the plant 1603. As shown in FIG. 16C, the customer turns around, thereby changing the image data captured for the shop 1601.

The customer may provide a touch-input or utterance instructing the customer device 1600 to preview the plant 1600 in a particular sub-space region of the customer's house. For example, the customer may utter "show me the plant in my living room next to the TV."

Figure 16D:
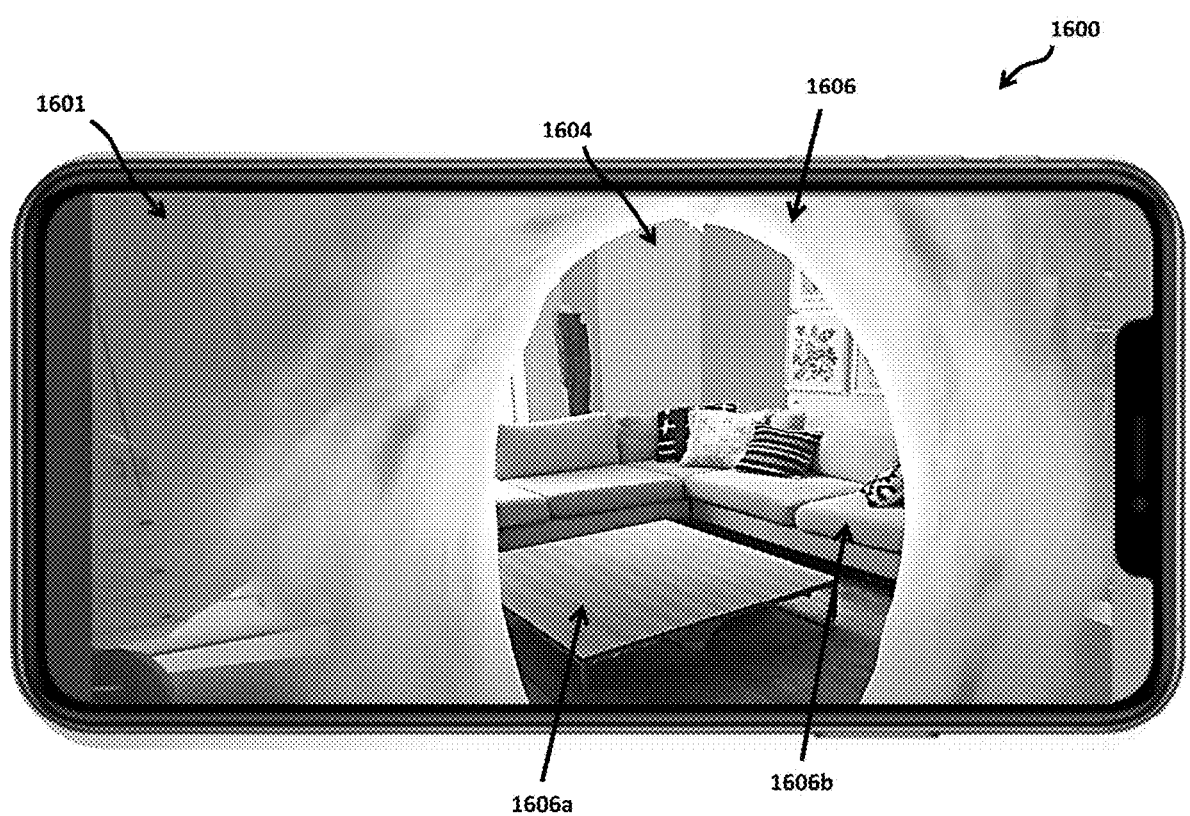

As shown in FIG. 16D, the customer device 1600 generates an overlay of a portal 1606 and overlay of a VR virtual environment of the virtual living room 1604, which augment the underlying real-world camera feed of the shop 1601. In this way, the client generates a mixed-reality presentation including both AR and VR virtual environment presentation. The customer device 1600 generates the AR virtual environment including the real-world camera feed of the shop 1601, augmented by the overlays of the VR virtual environment for the virtual living room 1604 and the portal 1606. The VR environment includes various virtual objects 1606a-1606e (sometimes collectively referred to as virtual object 1606 or virtual objects 1606), such as a virtual table 1606a and a virtual sofa 1606b.

Figure 16E:
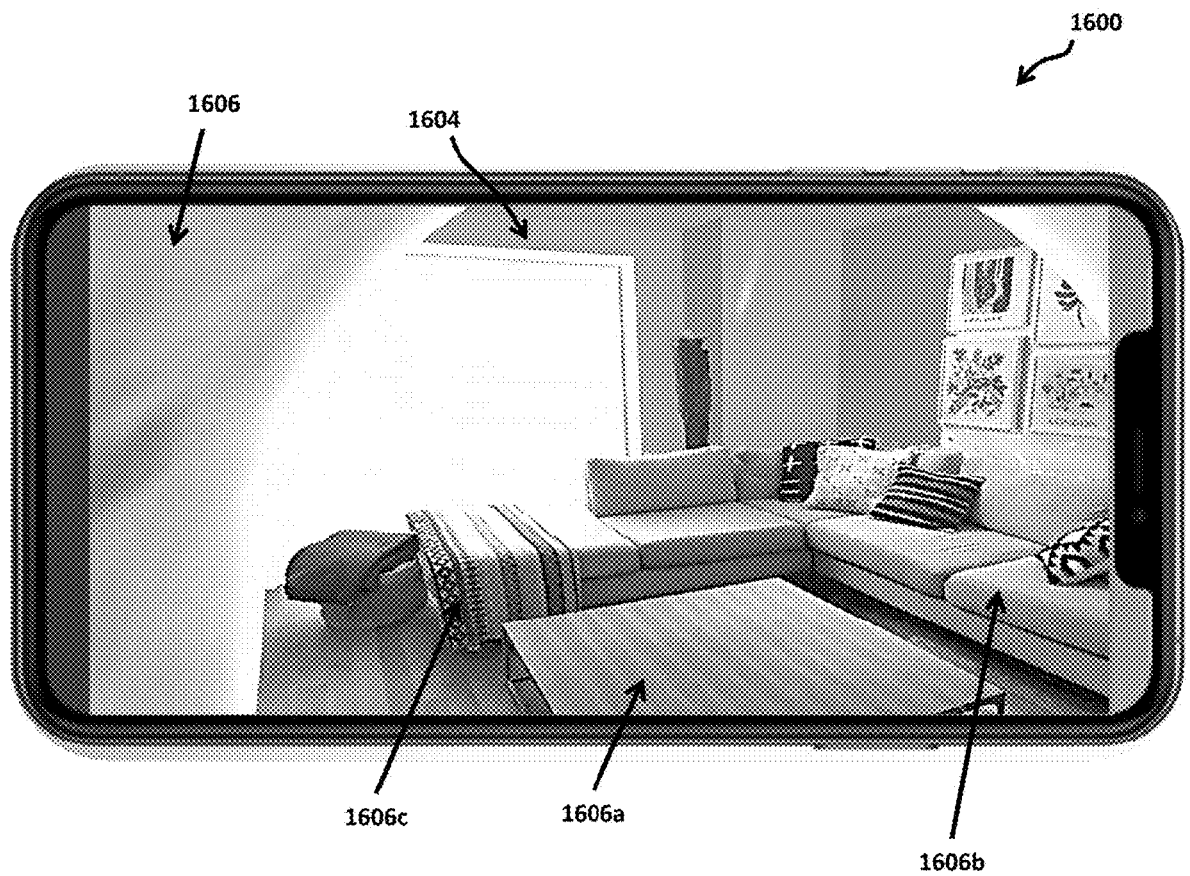

As shown in FIG. 16E, the customer may enter inputs into the touchscreen to traverse the portal 1606 or may physically step forward (simulating walking through the portal 1606). The client app may update the graphical user interface to simulate that the customer traversed the threshold of the portal 1606 and stepped into the middle of the virtual living room 1604. The real-world shop 1601 imagery is less-pronounced or no longer in the graphical user interface as the customer moves further "into" the virtual living room 1604. Likewise, additional virtual objects 1606 come into view as being situated in the virtual living room 1604, such as one or more blankets 1606c.

Figure 16F:
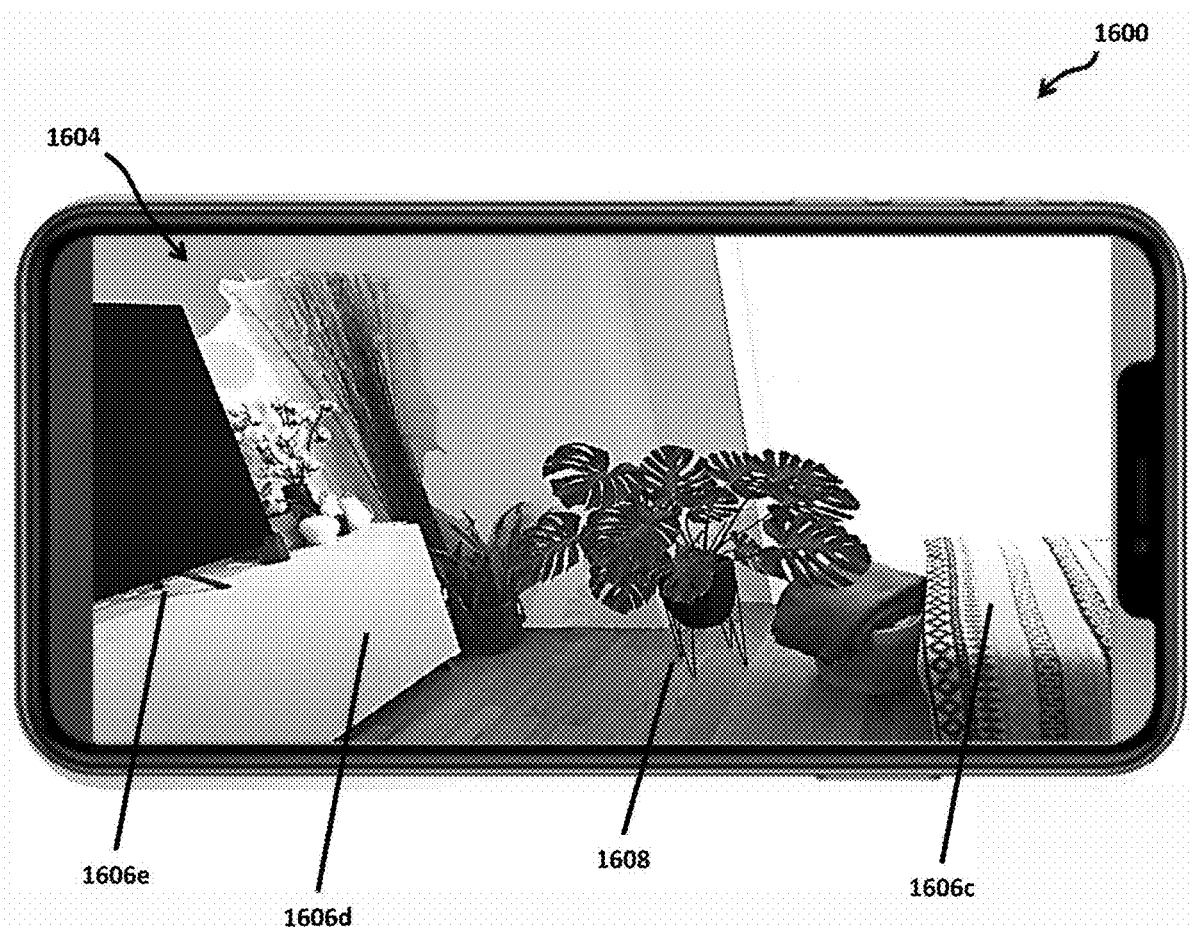

As shown in FIG. 16F, the graphical user interface no longer includes the real-world camera feed of the shop 1601 or the portal 1606. The customer device 1600 displays additional virtual objects 1606, including a virtual media stand 1606d, virtual TV 1606e, and a virtual preview plant 1608 representing the real-world plant 1608 in the shop 1601. The customer device 1600 determines positional parameters to situate the virtual plant 1608 by recognizing the verbal instructions in the customer's utterance, and determine the virtual environment for a particular sub-space region and positional parameters for generating and situating the virtual plant 1608 as indicated by the verbal instruction (e.g., "in the living room 1604 next to the TV 1606e").

In an embodiment, a computer-implemented method comprises receiving, by a computer, an utterance indicating an object; selecting, by the computer, a three-dimensional virtual environment based upon the utterance, wherein the three-dimensional virtual environment represents a region of a physical space; and providing for display, by the computer, a virtual object representing the object, the virtual object situated in the three-dimensional virtual environment at a position corresponding to the region of the physical space.

In some implementations, the three-dimensional virtual environment comprises the virtual object in an augmented representation of an image of the region from a camera.

In some implementations, the utterance is received from a client device. The method further comprises determining, by the computer, a location of the client device, where the computer generates the augmented representation of the image from the camera in response to determining that the client device is located in the region.

In some implementations, the method includes determining, by the computer, a spoken instruction in the utterance by applying a speech recognition function and a natural language processing (NLP) function on the utterance.

In some implementations, selecting the three-dimensional virtual environment based upon the instruction in the utterance includes identifying, by the computer, in a database, the three-dimensional virtual environment associated with a verbal identifier as indicated by the utterance.

In some implementations, selecting the three-dimensional virtual environment based upon the instruction includes determining, by the computer, an object type for the object indicated by the utterance; and identifying, by the computer, in a database the three-dimensional virtual environment associated with the object type.

In some implementations, the three-dimensional virtual environment is selected from a plurality of three-dimensional virtual environments associated with an end-user.

In some implementations, the method further comprises generating, by the computer, the three-dimensional virtual environment representing the region based upon the one or more source images depicting the region.

In some implementations, the method further comprises generating, by the computer, in a database one or more object tables corresponding to one or more regions associated with an end-user, wherein an object table corresponding to the region indicates a set of one or more objects associated with the region.

In some implementations, the object in the utterance is associated with the set of one or more objects associated with the region, and the computer selects the three-dimensional virtual environment representing the region using the object table corresponding to the region.

In some implementations, the method further comprises determining, by the computer, a region type of the region based upon one or more attributes of the region, the one or more attributes of the region including at least one of: a set of one or more objects in the region or a set of one or more spatial features.

In some implementations, the method further comprises generating, by the computer, one or more identifiers for the region based upon the region type as determined by the computer based upon the one or more attributes of the region.

In some implementations, the computer determines an object type of the object indicated by the utterance, and the computer determines that the object type of the object is associated with the set of one or more objects associated with the region type of the region.

In some implementations, the method further comprises obtaining, by the computer, a plurality of virtual objects corresponding to a plurality of objects identified in source image data for the region; and for each virtual object, determining, by the computer, the position of the virtual object according to a plurality of spatial parameters of a three-dimensional coordinate system of the three-dimensional virtual environment corresponding to the region of the physical space.

In some implementations, the position of the virtual object for the object indicated by the utterance is relative to one or more attributes of a second virtual object of the plurality of objections, the one or more attributes of the second virtual object including at least one of: an object type or a spatial feature.

In some implementations, the method further comprises identifying, by the computer, a positioning collision in the three-dimensional coordinate system based upon each position determined for a second virtual object of the plurality of virtual objects and the virtual object for the object indicated by the utterance; and modifying, by the computer, the position of the virtual object for the objection indicated by the utterance responsive to the position collision.

In some embodiments, a system comprises a computer including a processor configured to receive an utterance indicating an object; select a three-dimensional virtual environment based upon the utterance, where the three-dimensional virtual environment represents a region of a physical space; and provide for display a virtual object representing the object, the virtual object situated in the three-dimensional virtual environment at a position corresponding to the region of the physical space.

In some implementations, the three-dimensional virtual environment comprises the virtual object in an augmented representation of an image of the region from a camera.

In some implementations, the utterance is received from a client device. The computer further is configured to determine a location of the client device. The computer generates the augmented representation of the image from the camera in response to determining that the client device is located in the region.

In some implementations, the method further comprises determining, by the computer, a spoken instruction in the utterance by applying a speech recognition function and a natural language processing (NLP) function on the utterance.

In some implementations, when selecting the three-dimensional virtual environment based upon the instruction in the utterance the computer is further configured to identify in a database the three-dimensional virtual environment associated with a verbal identifier as indicated by the utterance.

In some implementations, when selecting the three-dimensional virtual environment based upon the instruction the computer is further configured to determine an object type for the object indicated by the utterance; and identify in a database the three-dimensional virtual environment associated with the object type.

In some implementations, the three-dimensional virtual environment is selected from a plurality of three-dimensional virtual environments associated with an end-user.

In some implementations, the computer is further configured to generate the three-dimensional virtual environment representing the region based upon the one or more source images depicting the region.

In some implementations, the computer is further configured to generate in a database one or more object tables corresponding to one or more regions associated with an end-user, where an object table corresponding to the region indicates a set of one or more objects associated with the region.

In some implementations, the object in the utterance is associated with the set of one or more objects associated with the region. The computer selects the three-dimensional virtual environment representing the region using the object table corresponding to the region.

In some implementations, the computer is further configured to determine a region type of the region based upon one or more attributes of the region. The one or more attributes of the region including at least one of: a set of one or more objects in the region or a set of one or more spatial features.

In some implementations, the computer is further configured to generate one or more identifiers for the region based upon the region type as determined by the computer based upon the one or more attributes of the region.

In some implementations, the computer is further configured to determine an object type of the object indicated by the utterance; and determine that the object type of the object indicated by the utterance is associated with the set of one or more objects associated with the region type of the region.

In some implementations, the computer is further configured to obtain a plurality of virtual objects corresponding to a plurality of objects identified in source image data for the region; and for each virtual object, determine the position of the virtual object according to a plurality of spatial parameters of a three-dimensional coordinate system of the three-dimensional virtual environment corresponding to the region of the physical space.

In some implementations, the position of the virtual object for the object indicated by the utterance is relative to one or more attributes of a second virtual object of the plurality of objections. The one or more attributes of the second virtual object including at least one of: an object type or a spatial feature.

In some implementations, the computer is further configured to identify a positioning collision in the three-dimensional coordinate system based upon each position determined for a second virtual object of the plurality of virtual objects and the virtual object for the object indicated by the utterance; and modify the position of the virtual object for the objection indicated by the utterance responsive to the position collision.

In some embodiments, a machine-readable storage medium having computer-executable instructions stored thereon that, when executed by one or more processors, cause the one or more processors to perform operations comprises receiving, by a processor, an utterance indicating an object; selecting, by the processor, a three-dimensional virtual environment based upon the utterance, wherein the three-dimensional virtual environment represents a region of a physical space; and providing for display, by the processor, a virtual object representing the object, the virtual object situated in the three-dimensional virtual environment at a position corresponding to the region of the physical space.

The foregoing method descriptions and the process flow diagrams are provided merely as illustrative examples and are not intended to require or imply that the operations of the various embodiments must be performed in the order presented. The operations in the foregoing embodiments may be performed in any order. Words such as "then," "next," etc., are not intended to limit the order of the operations; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Neither the claimed features nor this disclosure is limited in terms of particular software code or specialized control hardware being used to implement the subject matter disclosed herein. Thus, the operation and behavior of the systems and methods were described without reference to the specific software code being understood that software and control hardware can be provided to implement the systems and methods based on the description herein.

When implemented in software, the functions may be stored as one or more instructions or code on a non-transitory computer-readable or processor-readable storage medium. The operations of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
   obtaining, by a computer, a first utterance indicating an object;
   providing for display, by the computer, a three-dimensional environment representing a physical space, the three-dimensional environment including a virtual object representing the object indicated by the first utterance; and
   obtaining, by the computer, a second utterance providing a checkout instruction, the checkout instruction of the second utterance indicating the virtual object situated in the three-dimensional environment for a purchase transaction.

2. The method according to claim 1, wherein the three-dimensional environment includes an augmented reality representation comprising the virtual object situated in an image of the physical space obtained via a camera feed, wherein the method further comprises:
   obtaining, by the computer, an instruction to change the three-dimensional environment from the augmented reality representation to a virtual reality representation of the physical space of the three-dimensional environment; and
   providing for display, by the computer, the virtual reality representation including the virtual object representing the object situated in the virtual reality representation.

3. The method according to claim 1, further comprising:
   obtaining, by the computer, source image data via a camera feed for a region of the physical space;
   determining, by the computer, one or more attributes of the three-dimensional environment based upon the source image data for the region of the physical space; and
   generating, by the computer, the three-dimensional environment comprising an augmented reality representation of the region of the physical space in the camera feed based upon the one or more attributes of the three-dimensional environment and the virtual object positioned in the augmented reality representation.

4. The method according to claim 1, further comprising:
   obtaining, by the computer, a source image data for a region of the physical space;
   determining, by the computer, one or more attributes of the three-dimensional environment based upon the source image data for the region of the physical space; and
   generating, by the computer, the three-dimensional environment comprising a virtual reality representation of the region of the physical space based upon the one or more attributes of the three-dimensional environment and the virtual object positioned in the virtual reality representation.

5. The method according to claim 1, further comprising updating, by the computer, one or more attributes of the three-dimensional environment representing a region of the physical space based upon source image data for the region of the physical space.

6. The method according to claim 1, further comprising:
   obtaining, by the computer, a location of a client device, wherein the three-dimensional environment is provided for display at the client device; and
   generating, by the computer, a type of representation of the three-dimensional environment based upon the location of the client device relative to the physical space, wherein the type of representation includes at least one of an augmented reality representation or a virtual reality representation.

7. The method according to claim 1, further comprising determining, by the computer, the position of the virtual object according to one or more attributes of the virtual object and a plurality of spatial parameters of the three-dimensional environment.

8. The method according to claim 7, further comprising identifying, by the computer, a positioning collision in the three-dimensional environment based upon the position determined for the virtual object and a second position of a second virtual object representing a second object in the three-dimensional environment.

9. The method according to claim 1, further comprising updating, by the computer, one or more attributes of the virtual object in the three-dimensional environment based upon updated media data including the object represented by the virtual object.

10. The method according to claim 1, further comprising selecting, by the computer, a region of the physical space to be represented in the three-dimensional virtual environment based upon a user input associated with the first utterance.

11. A system comprising:
a computer comprising at least one processor configured to:
obtain a first utterance indicating an object;
provide for display a three-dimensional environment representing a physical space, the three-dimensional environment including a virtual object representing the object indicated by the first utterance; and
obtain a second utterance providing a checkout instruction, the checkout instruction of the second utterance indicating the virtual object situated in the three-dimensional environment for a purchase transaction.

12. The system according to claim 11, wherein the three-dimensional environment includes an augmented reality representation comprising the virtual object situated in an image of the physical space obtained via a camera feed,
wherein the at least one processor of the computer is further configured to:
obtain an instruction to change the three-dimensional environment from the augmented reality representation to a virtual reality representation of the physical space of the three-dimensional environment; and
provide the virtual reality representation including the virtual object representing the object situated in the virtual reality representation.

13. The system according to claim 11, wherein the at least one processor of the computer is further configured to:
obtain source image data via a camera feed for a region of the physical space;
determine one or more attributes of the three-dimensional environment based upon the source image data for the region of the physical space; and
generate the three-dimensional environment comprising an augmented reality representation of the region of the physical space in the camera feed based upon the one or more attributes of the three-dimensional environment and the virtual object positioned in the augmented reality representation.

14. The system according to claim 11, wherein the at least one processor of the computer is further configured to:
obtain a source image data for a region of the physical space;
determine one or more attributes of the three-dimensional environment based upon the source image data for the region of the physical space; and
generate the three-dimensional environment comprising a virtual reality representation of the region of the physical space based upon the one or more attributes of the three-dimensional environment and the virtual object positioned in the virtual reality representation.

15. The system according to claim 11, wherein the at least one processor of the computer is further configured to update one or more attributes of the three-dimensional environment representing a region of the physical space based upon source image data for the region of the physical space.

16. The system according to claim 11, wherein the at least one processor of the computer is further configured to:
obtain a location of a client device, wherein the three-dimensional environment is provided for display at the client device; and
generate a type of representation of the three-dimensional environment based upon the location of the client device relative to the physical space, wherein the type of representation includes at least one of an augmented reality representation or a virtual reality representation.

17. The system according to claim 11, wherein the at least one processor of the computer is further configured to determine the position of the virtual object according to one or more attributes of the virtual object and a plurality of spatial parameters of the three-dimensional environment.

18. The system according to claim 17, wherein the at least one processor of the computer is further configured to identify a positioning collision in the three-dimensional environment based upon the position determined for the virtual object and a second position of a second virtual object representing a second object in the three-dimensional environment.

19. The system according to claim 11, wherein the at least one processor of the computer is further configured to update one or more attributes of the virtual object in the three-dimensional environment based upon updated media data including the object represented by the virtual object.

20. A non-transitory machine-readable storage medium having computer-executable instructions stored thereon that, when executed by one or more processors, cause the one or more processors to perform operations of:
obtaining a first utterance indicating an object;
providing for display a three-dimensional environment representing a physical space, the three-dimensional environment including a virtual object representing the object indicated by the first utterance; and
obtaining a second utterance providing a checkout instruction, the checkout instruction of the second utterance indicating the virtual object situated in the three-dimensional environment for a purchase transaction.

* * * * *